(12) United States Patent
Kim et al.

(10) Patent No.: US 10,572,130 B2
(45) Date of Patent: Feb. 25, 2020

(54) SYSTEMS AND METHODS FOR CONTROLLING POWER GENERATION PLANT OPERATIONS VIA A HUMAN-MACHINE INTERFACE

(71) Applicant: General Electric Company, Schenectady, NY (US)

(72) Inventors: So Young Kim, San Ramon, CA (US); Nagesh Laxminarayana Kurella, Andhra Pradesh (IN); Lester D. Childs, Greenville, SC (US); James Vanwormer, Schenectady, NY (US); Jonathan Mann, Schenectady, NY (US)

(73) Assignee: General Electric Company, Schenectady, NY (US)

(*) Notice: Subject to any disclaimer, the term of this patent is extended or adjusted under 35 U.S.C. 154(b) by 466 days.

(21) Appl. No.: 14/920,464

(22) Filed: Oct. 22, 2015

(65) Prior Publication Data
US 2016/0328133 A1    Nov. 10, 2016

Related U.S. Application Data

(60) Provisional application No. 62/158,951, filed on May 8, 2015.

(51) Int. Cl.
G06F 3/0482       (2013.01)
G06F 3/0484       (2013.01)
G05B 19/042       (2006.01)

(52) U.S. Cl.
CPC ....... *G06F 3/04847* (2013.01); *G05B 19/042* (2013.01); *G06F 3/0482* (2013.01); *G05B 2219/23258* (2013.01)

(58) Field of Classification Search
CPC ............... G06F 3/0482; G06F 3/04847; G05B 2219/23258
See application file for complete search history.

(56) References Cited

U.S. PATENT DOCUMENTS 5,227,122 A * 7/1993 Scarola .................. G21C 17/00
                                                    376/259
5,261,042 A * 11/1993 Brandt .................... G06F 9/451
                                                    715/841
6,002,398 A * 12/1999 Wilson ................. G06F 3/0481
                                                    715/777

(Continued)

OTHER PUBLICATIONS

So Young Kim and Jim Van Wormer, "Human-Machine Interface (HMI) design for power generation plant operators." Human—Systems Interaction Lab, Global Research Center, General Electric, San Ramon, California, USA. <www.ge.com>. 9 pages.

(Continued)

*Primary Examiner* — Dino Kujundzic
(74) *Attorney, Agent, or Firm* — Buckley, Maschoff & Talwalkar LLC

(57) ABSTRACT

Embodiments of the present disclosure relate to systems and methods for controlling power generation plant operations via a human-machine interface. In one embodiment, a method can provide: receiving a user selection of a power generation plant component in a first navigation menu of a human-machine interface (HMI); based at least in part on the user selection, generating a second navigation menu of the HMI; receiving a subsequent user selection of a subcomponent in the second navigation menu of the HMI, wherein the subcomponent is associated with the power generation plant component; generating a control region for the HMI, the control region operable to manipulate the subcomponent; receiving a user input for the control region; and based at least in part on the user input, facilitating manipulation of one or more operations of the subcomponent.

15 Claims, 34 Drawing Sheets

(56) References Cited

U.S. PATENT DOCUMENTS

| | | | | | |
|---|---|---|---|---|---|
| 6,104,399 | A | * | 8/2000 | Volkel | G06F 3/0482 345/184 |
| 6,421,571 | B1 | * | 7/2002 | Spriggs | G05B 15/02 345/629 |
| 6,594,588 | B1 | * | 7/2003 | Peden | G06F 8/34 702/32 |
| 6,889,096 | B2 | * | 5/2005 | Spriggs | G05B 15/02 340/3.71 |
| 7,047,092 | B2 | * | 5/2006 | Wimsatt | G05B 15/02 345/173 |
| 7,269,463 | B2 | * | 9/2007 | Nagatsuka | G05B 19/042 340/3.1 |
| 8,381,117 | B2 | * | 2/2013 | Ueno | G05B 23/0272 715/771 |
| 2004/0093188 | A1 | * | 5/2004 | Matsuno | G05B 19/409 19/409 |
| 2005/0238549 | A1 | * | 10/2005 | Hammel | C22B 7/006 422/168 |
| 2008/0016452 | A1 | * | 1/2008 | Pincus | H02J 13/001 715/763 |
| 2010/0050103 | A1 | * | 2/2010 | Husoy | G06F 3/0484 715/765 |
| 2010/0251184 | A1 | * | 9/2010 | Majewski | G06F 3/0482 715/841 |
| 2011/0029102 | A1 | * | 2/2011 | Campney | G05B 15/02 700/83 |
| 2012/0128113 | A1 | * | 5/2012 | Park | G21C 19/19 376/264 |
| 2014/0372900 | A1 | * | 12/2014 | de Sallier Dupin | G06F 3/0484 715/744 |
| 2015/0026622 | A1 | * | 1/2015 | Roaldson | G06F 3/0484 715/771 |
| 2015/0261379 | A1 | * | 9/2015 | Kneuper | G08G 5/0052 345/173 |

OTHER PUBLICATIONS

Jordanna Kwok, "Ecological Interface Design for Turbine Secondary Systems in a Nuclear Power Plant: Effects on Operator Situation Awareness." A thesis presented to the University of Waterloo. Waterloo, Ontario, Canada, 2007.

* cited by examiner

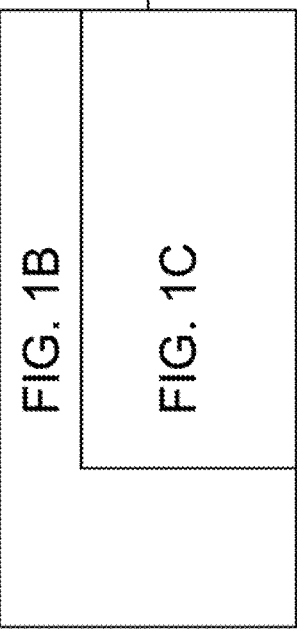
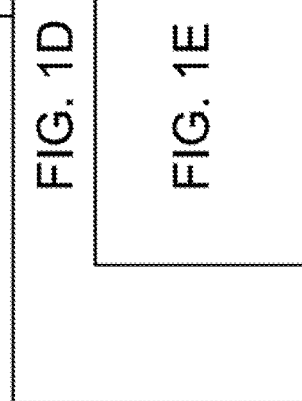
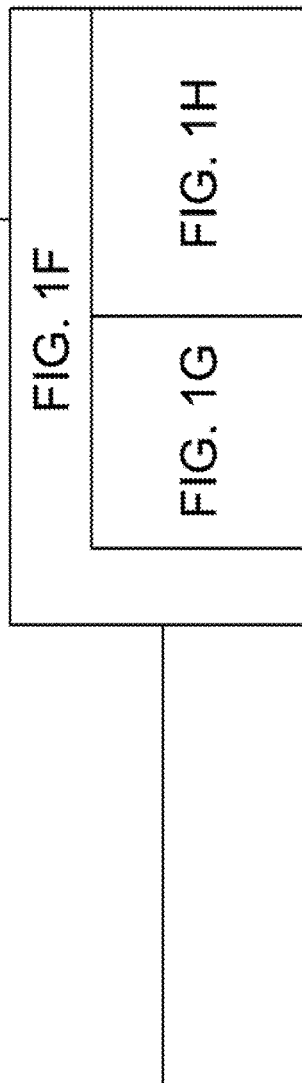
FIG. 1A

TOTAL PLANT Turbine — Trip Status: OK, Speed: 3000 RPM

ST OVERALL Power train clutch: OK, Vibration: OK

MAIN STEAM Press 210 psig, Temp 43 °F

HOT RH Press 210 psig, Temp 43 °F

LP STEAM Press 210 psig, Temp 43 °F

LP EXHAUST Press 0.5 in HgA

LUBE OIL Press 210 psig, Temp 43 °F

ACTIVE — Martin County Power Station 12:45 PM 12/24

GT | HRSG | ST | GEN | BOP | ELECTRIC →

Home :ST : Auxiliaries Lube, Oil & Lift Oil

- Auxiliaries
  - Drain
  - Hydraulic Fluid Oil/ETD
  - Lube, Seal & Lift Oil
  - Steam Seal
- Monitoring
- Tests & Maintenance

TASKS

MASTER RESET
DIAGNOSTIC RESET
ALARM VIEWER
ADD A NOTE

— 100

| | Screen type | Operator view | Information | Operator control |
|---|---|---|---|---|
| LEVEL 1 | Process oriented | Entire power plant | KPI's for plant operations and most critical information that impacts the entire process | None possible. This is to CONSUME information only |
| LEVEL 2 | Mostly process oriented with a mix of limited system-centric | Major unit or process inside the plant | -Information that the operator can do something about<br>-Information that is required for operators to perform any control functions included in the screen.<br>-Information that the operator needs to recognize quickly when something goes wrong | -Control functions that operators use frequently<br>-System items added for major equipment (controlled or not) when the status/diagnostics of that equipment impacts a process significantly<br>-Selection of those systems items depends on how the plant is configured |
| LEVEL 3 | Mix of process-oriented and system-centric | Limited to a sub-component of a unit or process | -Information that the operator can do something about<br>-Information that is required for operators to perform any control functions included in the screen. | Control actions for random or rare use only (e.g. transferring fuels, swapping certain pumps) |
| LEVEL 4 | Mostly system-centric contents with a mix of limited process initiating controls/content | The most narrow span of view/control | -P&ID-view style shall reflect the process relationship among equipment and components in an abstracted level.<br>-Information that operator can do something about and information that is required for operators to perform any control functions shall be included in the screen | Control actions shall be included when monitoring all equipment during actions. Access to relevant actual P&ID to the abstract P&ID view if existing |

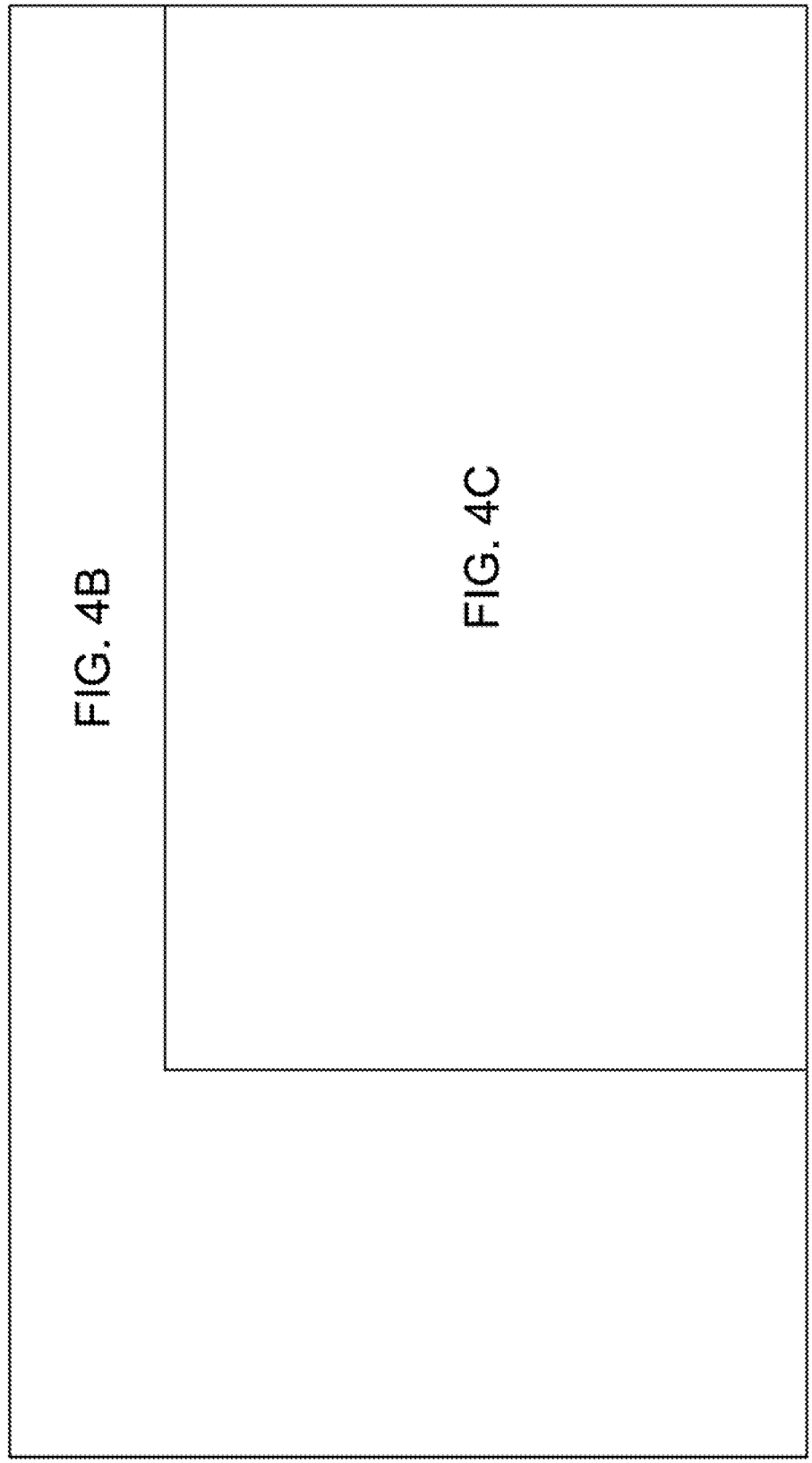

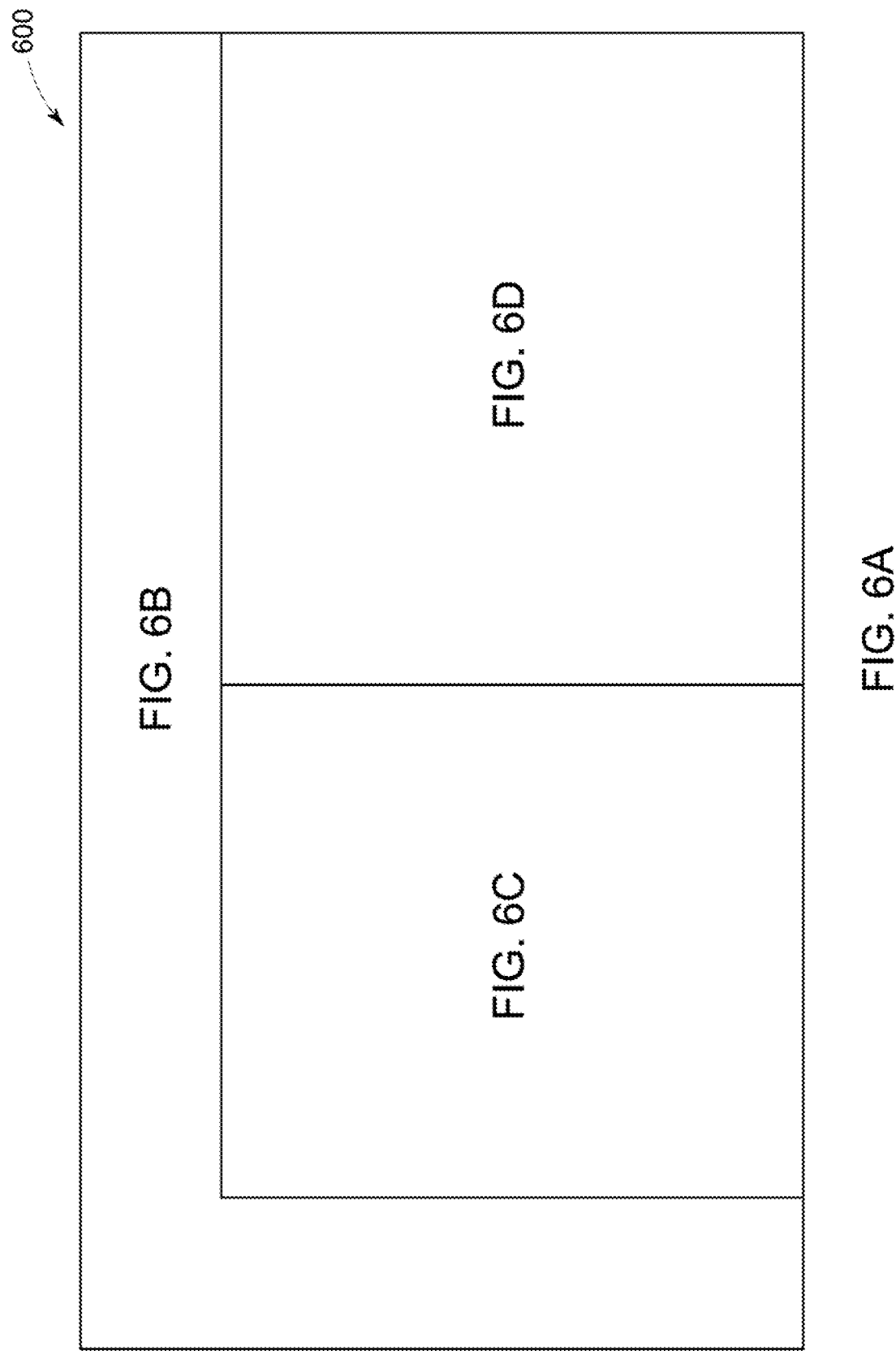

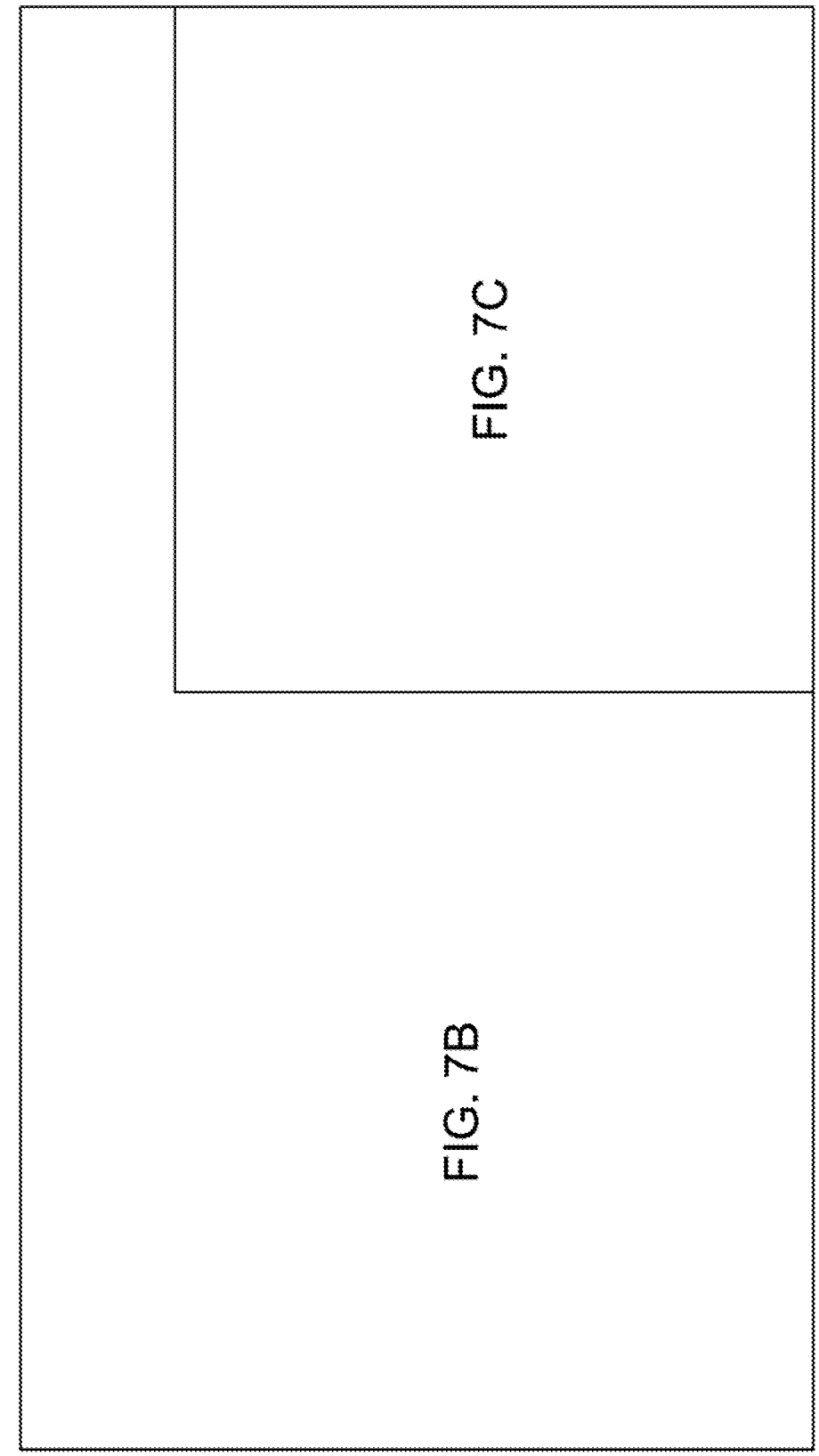

FIG. 7C

Transitions — 700

| | S0>S1 | S1 > S2 | S2 > S3 | S3 > S4 | S4 > S5 | S5 > S6 | S6 > RS3 | RS3 > RS2 | RS2 > RS1 | RS1 > S0 | S0 > S1 |
|---|---|---|---|---|---|---|---|---|---|---|---|
| | Status | Steps | | | | | | | | | Elapsed |
| + | ● S0.11 CONDENSER MAKEUP - AUTO | | | | | | | | | CONTROL GROUP | 00.02 |
| + | ⊗ S0.12 CONDENSER MAKEUP - ON | | | | | | | | | CONTROL GROUP | 03.36 |
| + | ○ S0.21 STEAM DRAIN TANKS - AUTO | | | | | | | | | CONTROL GROUP | 00.00 |
| + | ○ S0.22 STEAM DRAIN TANKS - ON | | | | | | | | | CONTROL GROUP | 00.00 |
| + | ○ S0.31 CONDENSATE AUTO | | | | | | | | | CONTROL GROUP | 00.00 |
| + | ○ S0.32 CONDENSATE ON | | | | | | | | | CONTROL GROUP | 00.00 |
| + | ○ S0.41 AUX STEAM AUTO | | | | | | | | | CONTROL GROUP | 00.00 |
| + | ○ S0.42 AUX STEAM ON | | | | | | | | | CONTROL GROUP | 01.17 |
| + | ○ S0.51 STEAM SEALS AUTO | | | | | | | | | CONTROL GROUP | 00.00 |
| + | ○ S0.52 STEAM SEALS ON | | | | | | | | | CONTROL GROUP | 00.00 |
| + | ○ S0.61 CONDENSER AIR REMOVAL SYSTEM AUTO | | | | | | | | | CONTROL GROUP | 00.00 |
| + | ○ S0.62 CONDENSER AIR REMOVAL SYSTEM ON | | | | | | | | | | 00.00 |
| + | ○ S0.71 ACC FANS AUTO | | | | | | | | | | 00.00 |
| + | ○ S0.72 ACC FANS ON | | | | | | | | | CONTROL GROUP | 00.00 |
| + | ○ S0.62 CONDENSER AIR REMOVAL SYSTEM ON | | | | | | | | | CONTROL GROUP | 01.11 |
| + | ○ S0.80 STEADY STATE S1 | | | | | | | | | | 00.00 |
| + | ○ S0.90 BOP START SEQ COMPLETE | | | | | | | | | | |

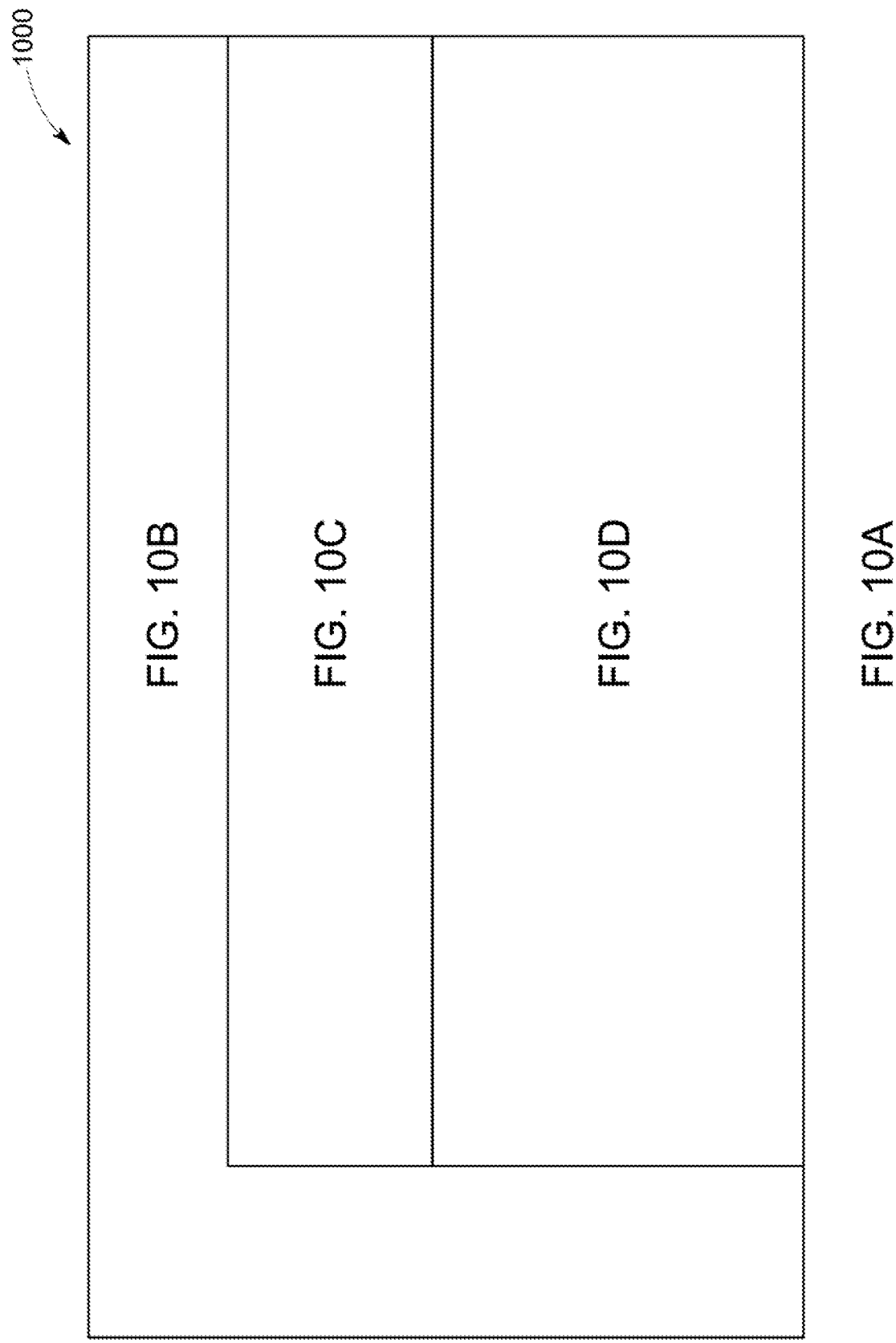

FIG. 10C

SYSTEMS AND METHODS FOR CONTROLLING POWER GENERATION PLANT OPERATIONS VIA A HUMAN-MACHINE INTERFACE

RELATED APPLICATION

This application claims priority to U.S. Provisional Ser. No. 62/158,951, filed May 8, 2015, titled "Systems and Methods for Controlling Power Generation Plant Operations Via a Human-Machine Interface," the contents of which are incorporated by reference.

TECHNICAL FIELD

The disclosure relates to power generation plant operations, and more particularly relates to systems and methods for controlling power generation plant operations via a human-machine interface (HMI).

BACKGROUND

When operating a power generation plant, conventional computer interfaces can typically present a power plant operator with a variety of information critical to operation of the power generation plant. For example, information associated with control parameters of a gas turbine may be collected, monitored, analyzed, and/or presented to a power plant operator via one or more computer display interfaces. However, different pieces of information may be located on different display interfaces, stored in different storage locations, accessible only by particular display interfaces, and/or the like. Therefore it may be difficult and time-consuming for the operator to navigate different display interfaces to locate, retrieve, and/or utilize different pieces of information.

For example, conventional computer display interfaces used by power generation plant operators may include a large number of display interfaces, each with different information critical to operation of the power generation plant. Some display interfaces may be directed to monitoring particular operational characteristics of the power generation plant (e.g., an amount of power being generated by the power generation plant, a temperature, a rotational speed of a turbine, a time, various values of combustion, compression, and/or the like), while other display interfaces may be directed to controlling one or more operations of the power generation plant (e.g., tasks such as startups, shutdowns, throttling a rotational speed of a turbine, and/or the like).

In some instances, conventional display interfaces are typically disorganized, which may make it difficult for a power generation plant operator to quickly locate critical information. These may be particularly burdensome during times when a quick and/or immediate response is required by the power generation plant operator. For example, if a rotational speed of a turbine of a power generation plant exceeds a particular threshold value to where operation of the turbine becomes unsafe, an operator must quickly respond by controlling the rotational speed of the turbine to reduce the rotational speed of the turbine to a safe rotational speed.

BRIEF DESCRIPTION OF THE FIGURES

The detailed description is set forth with reference to the accompanying drawings, which are not necessarily drawn to scale. The use of the same reference numbers in different figures indicates similar or identical items.

Figure 1B:
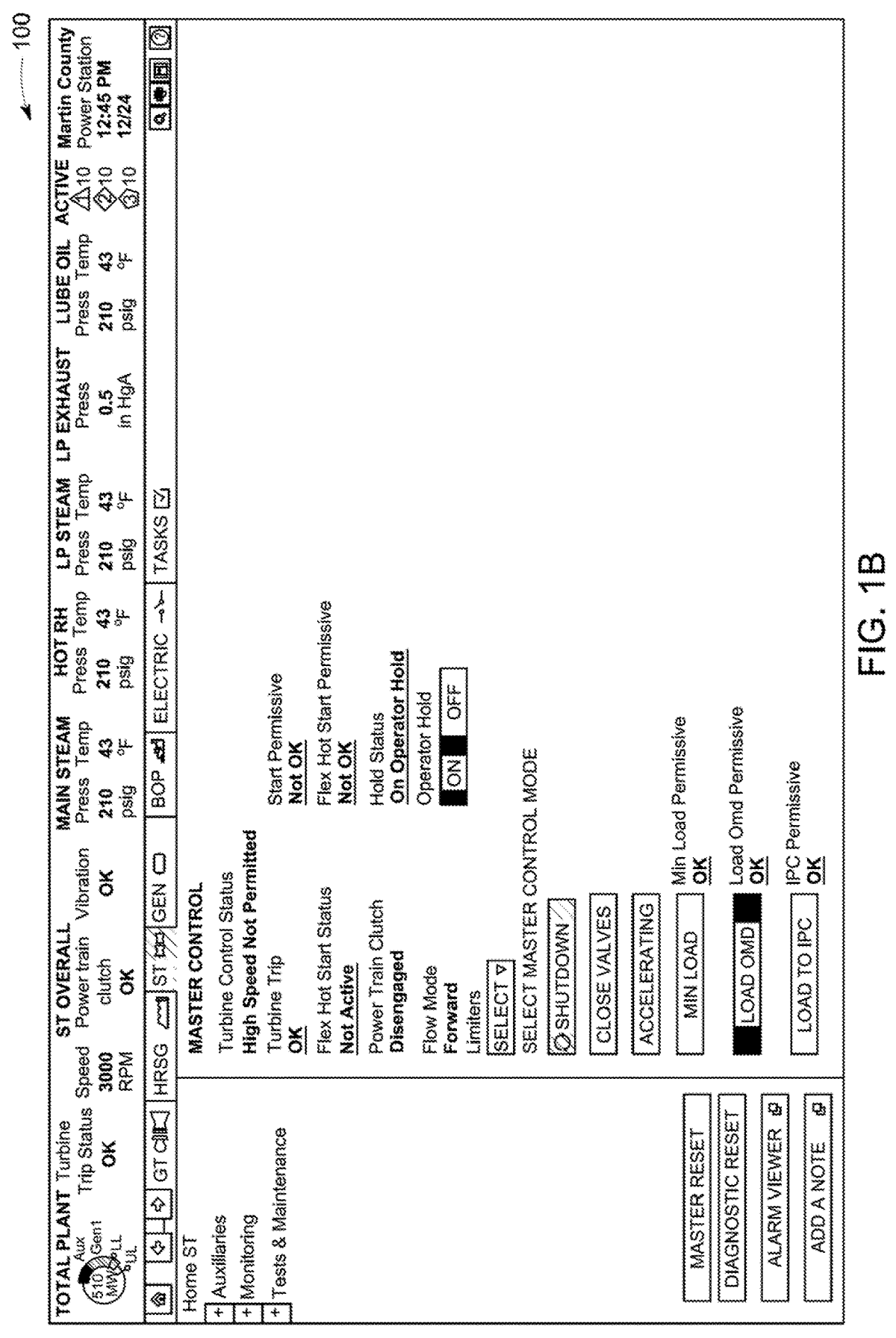
Figure 1D:
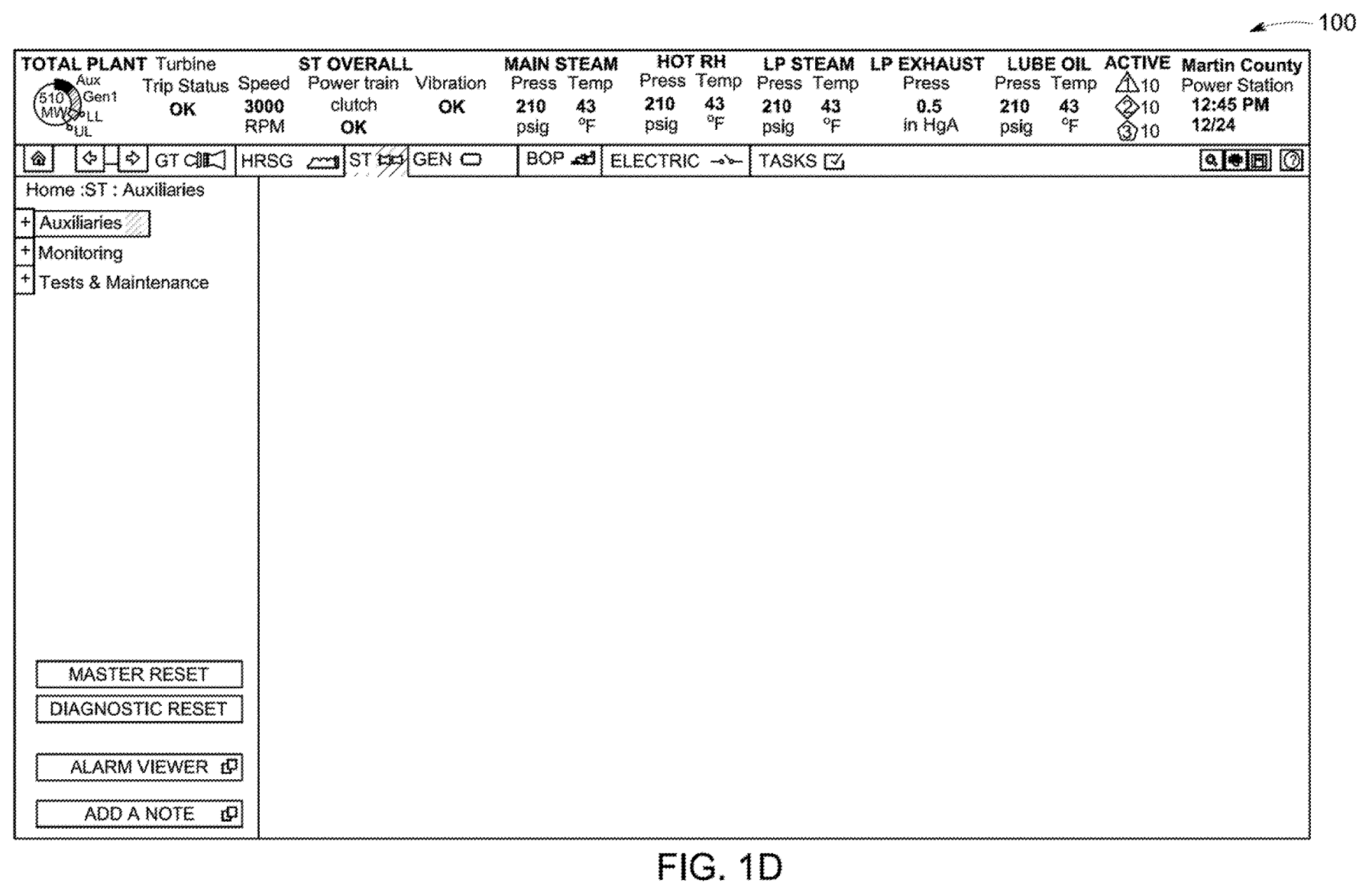
Figure 1E:
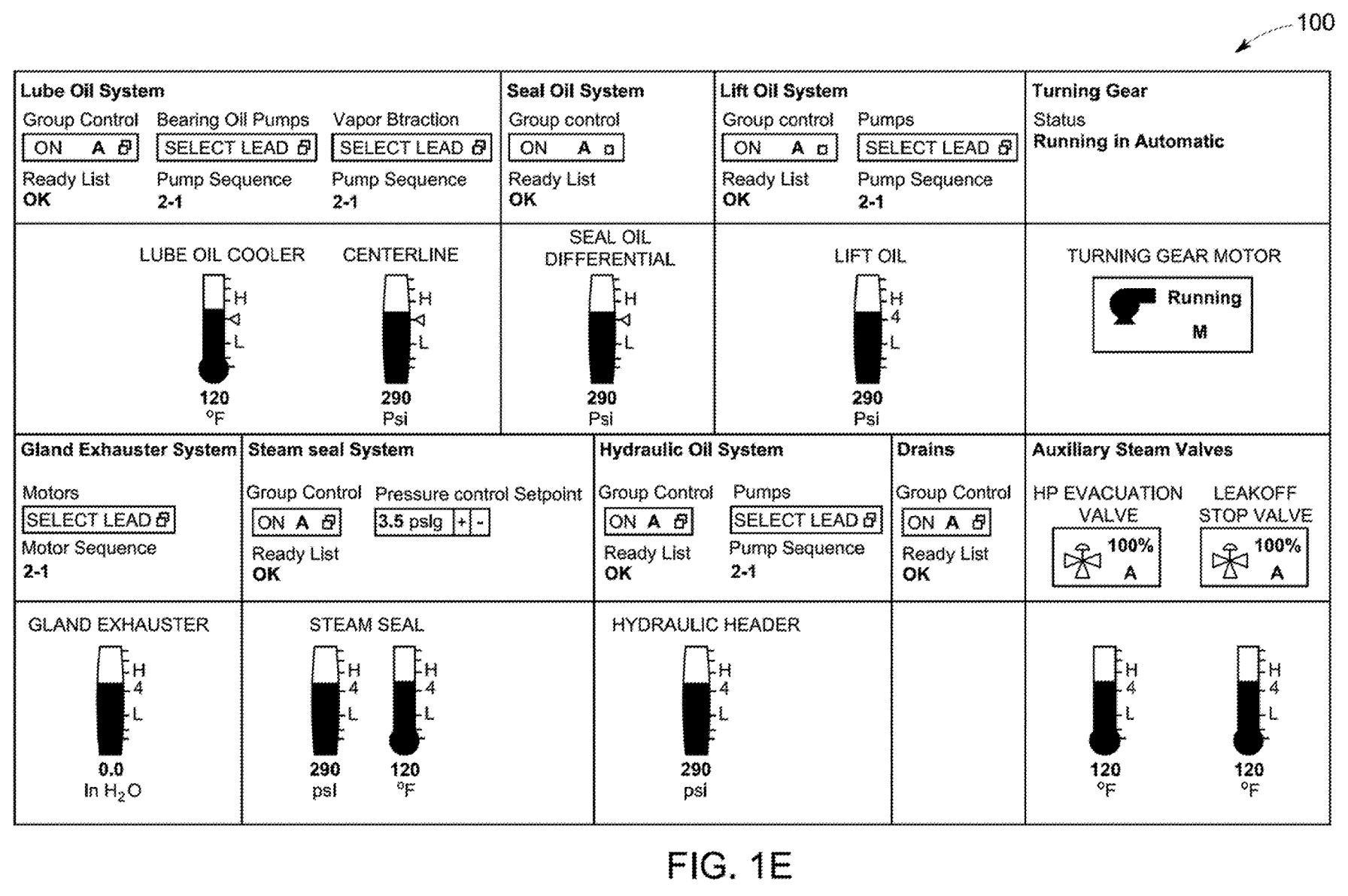

FIGS. 1A-1H depict an example hierarchy of screen interfaces for a human-machine interface (HMI), according to one embodiment of the disclosure.

FIG. 2 is an example table describing example characteristics for the hierarchy of screen interfaces shown in FIG. 1, according to one embodiment of the disclosure.

FIGS. 4A-4C is an example of another screen interface for a HMI, according to one embodiment of the disclosure.

FIGS. 5A-5C is an example of yet another screen interface for a HMI, according to one embodiment of the disclosure.

FIGa. 6A-6D is an example of yet another screen interface for a HMI, according to one embodiment of the disclosure.

Figure 7B:
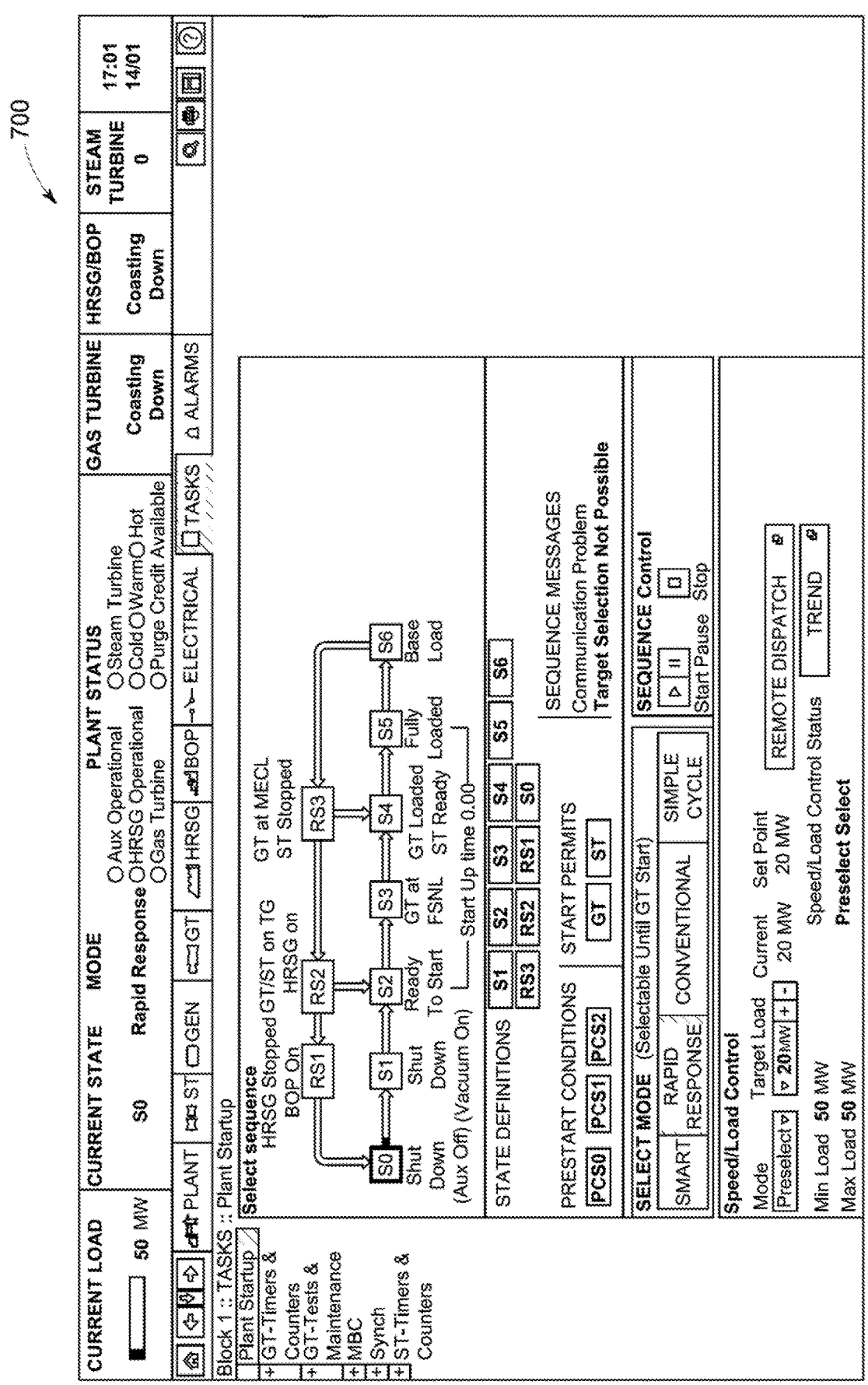

FIGS. 7A-7C is an example task-based screen interface for a HMI, according to one embodiment of the disclosure.

Figure 8:
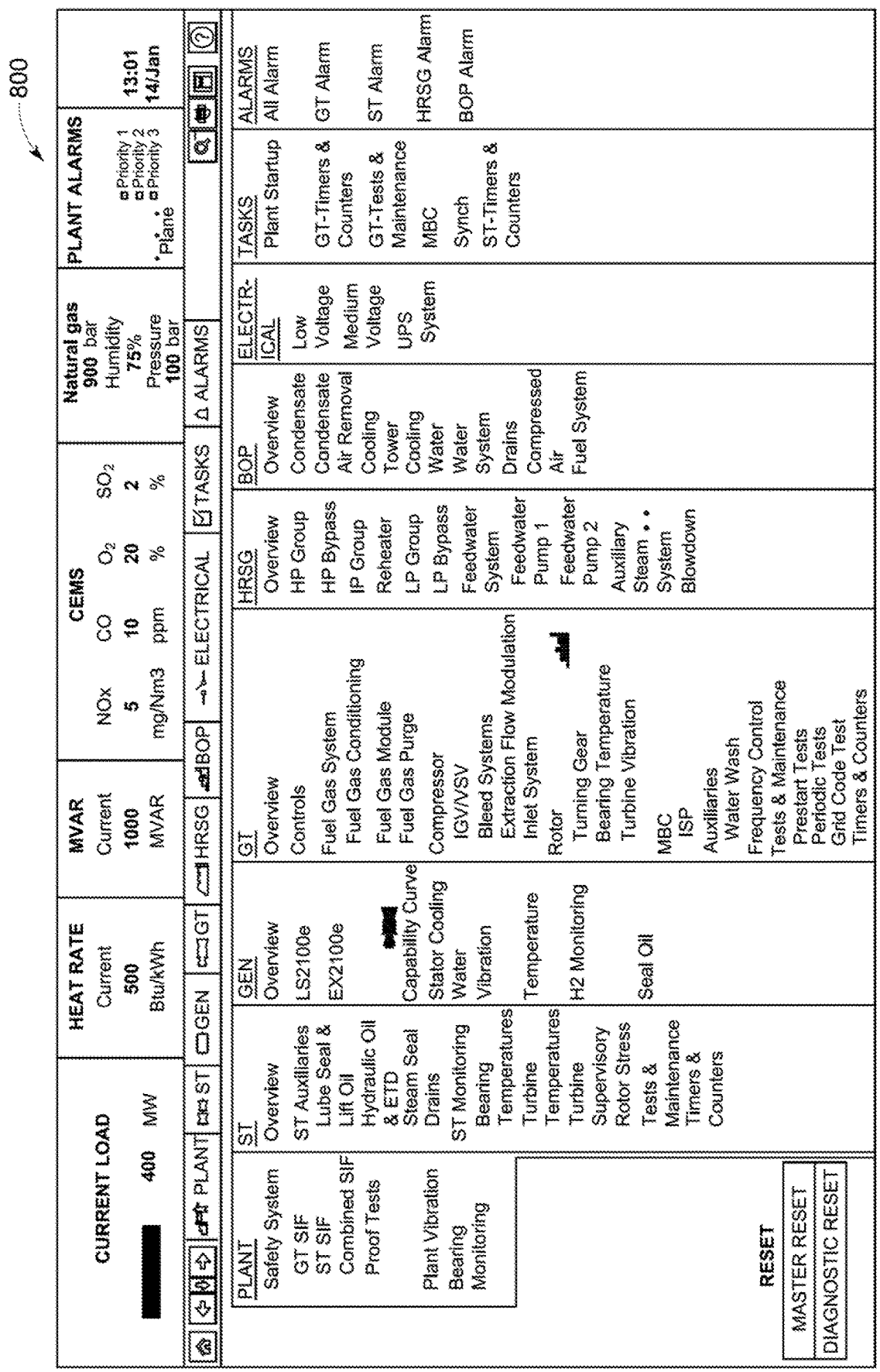

FIG. 8 is an example home page screen interface for a HMI, according to one embodiment of the disclosure.

Figure 9:
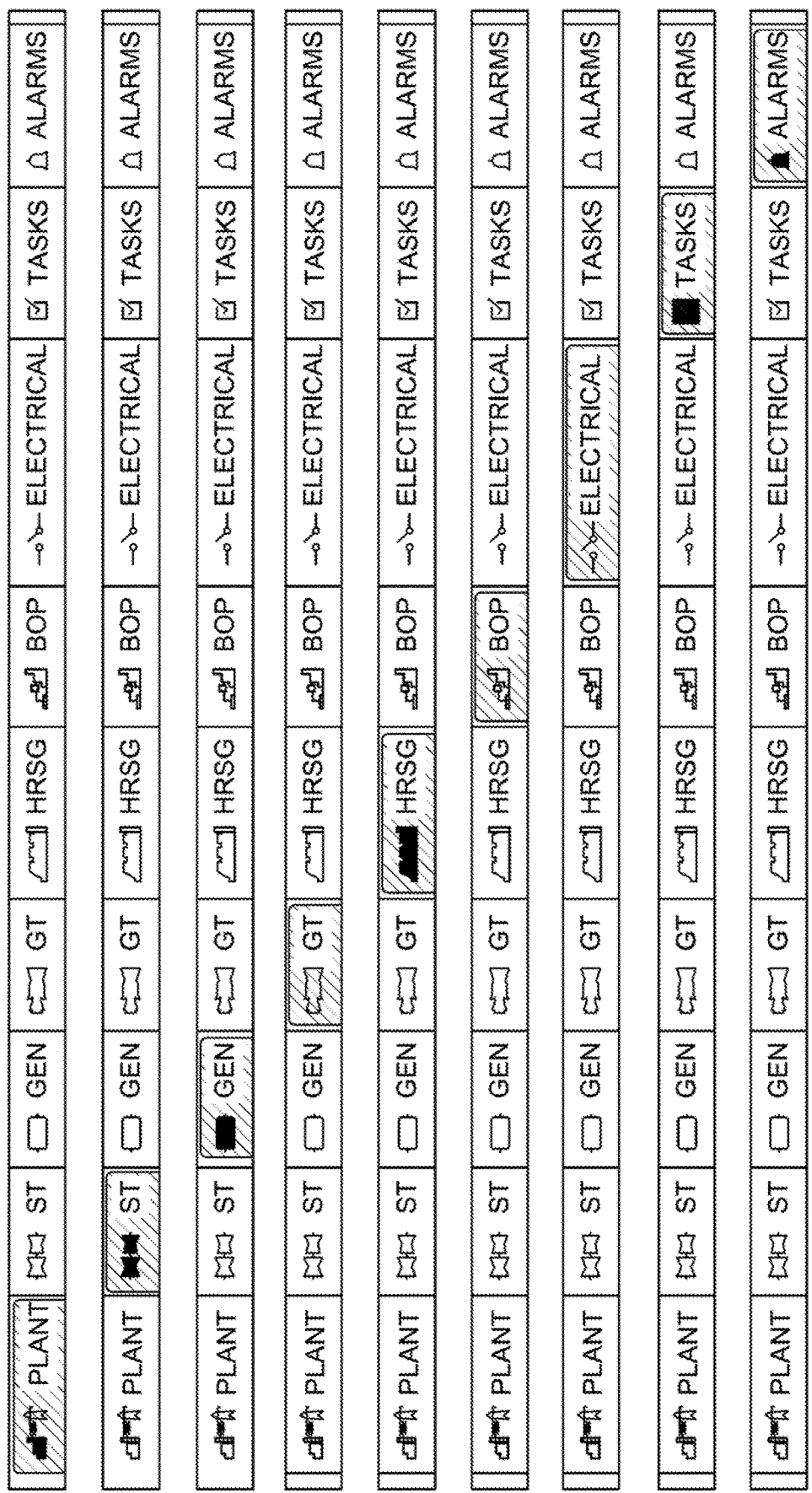
Figure 10B:
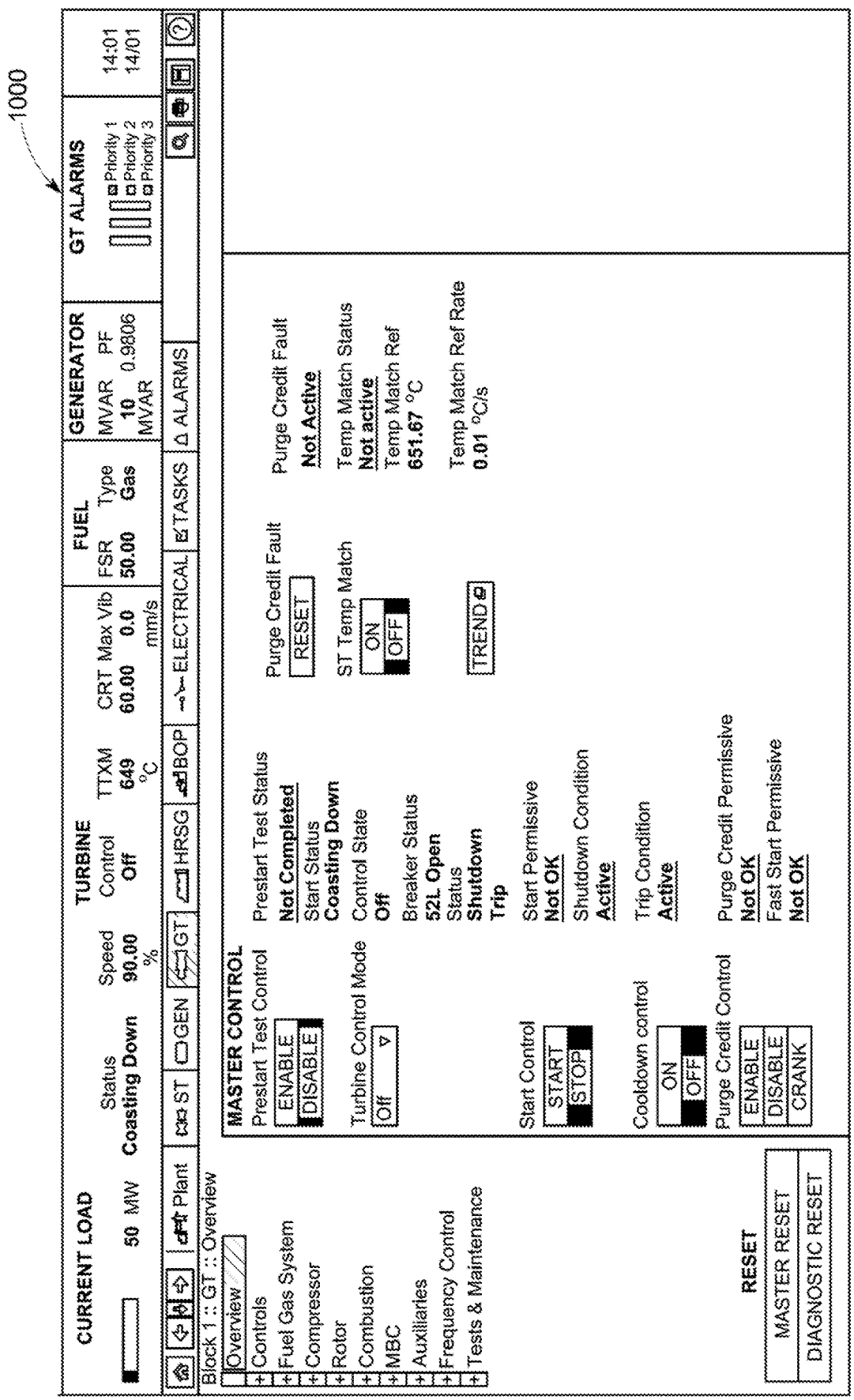
Figure 10D:
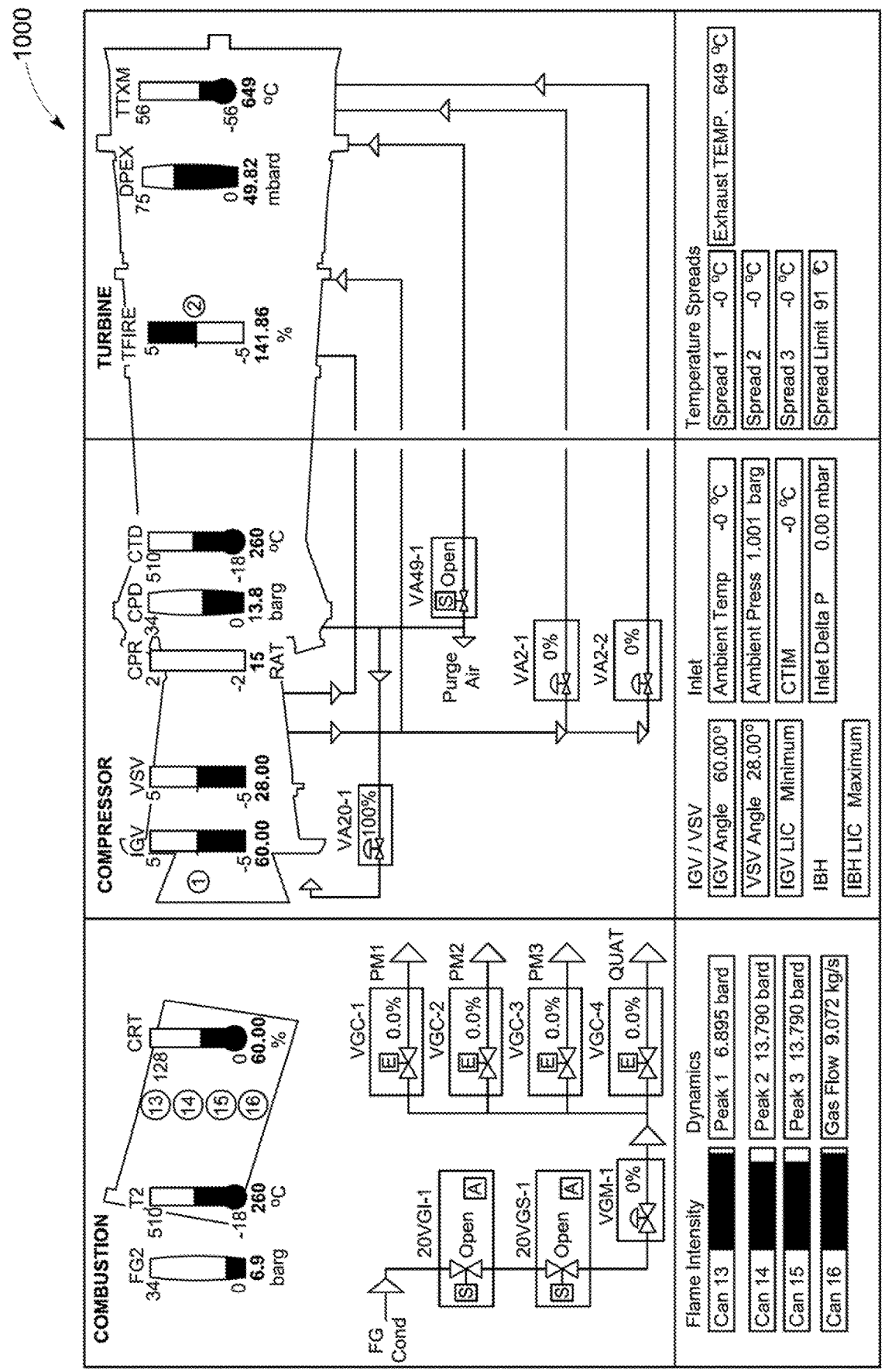

FIG. 9 is an example group of navigation tools for a HMI, according to one embodiment of the disclosure.

Figure 10C:
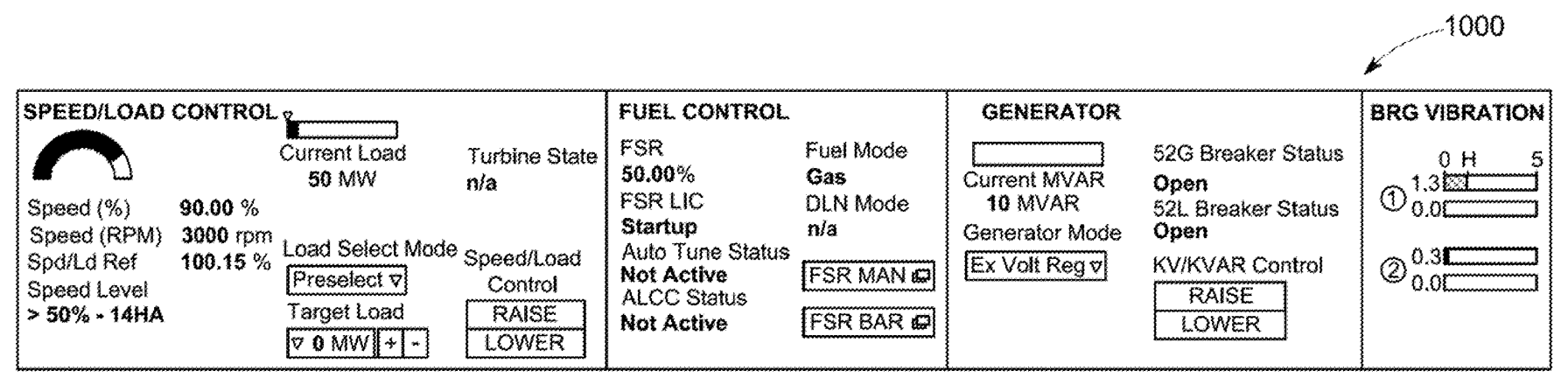

FIGS. 10A-10D is an example navigation menu screen for a HMI, according to one embodiment of the disclosure.

Figure 11:
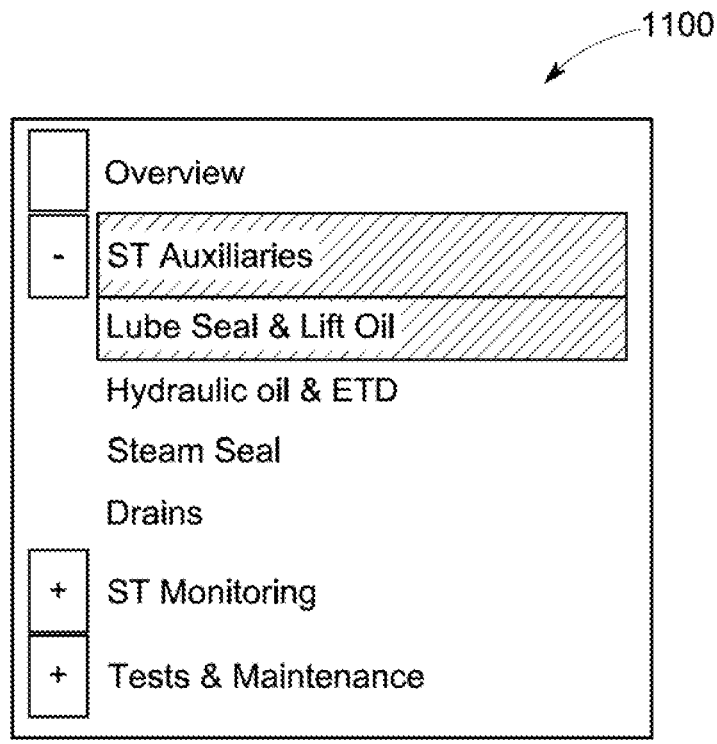

FIG. 11 is an example expanded navigation menu screen for a HMI, according to one embodiment of the disclosure.

Figure 12:
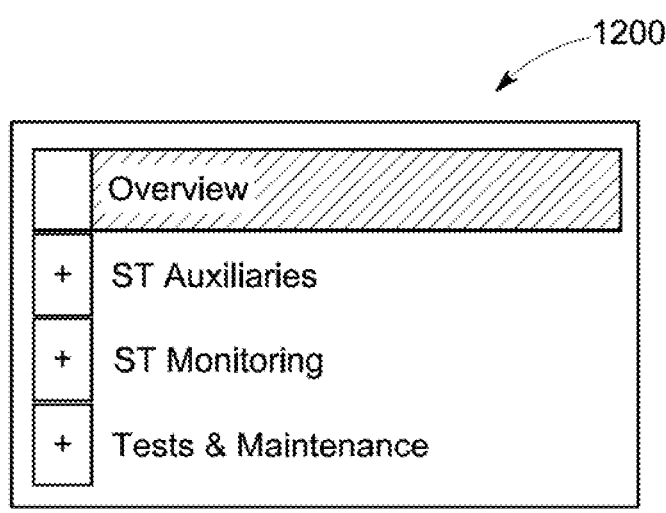

FIG. 12 is an example collapsed navigation menu for a HMI, according to one embodiment of the disclosure.

Figure 13:
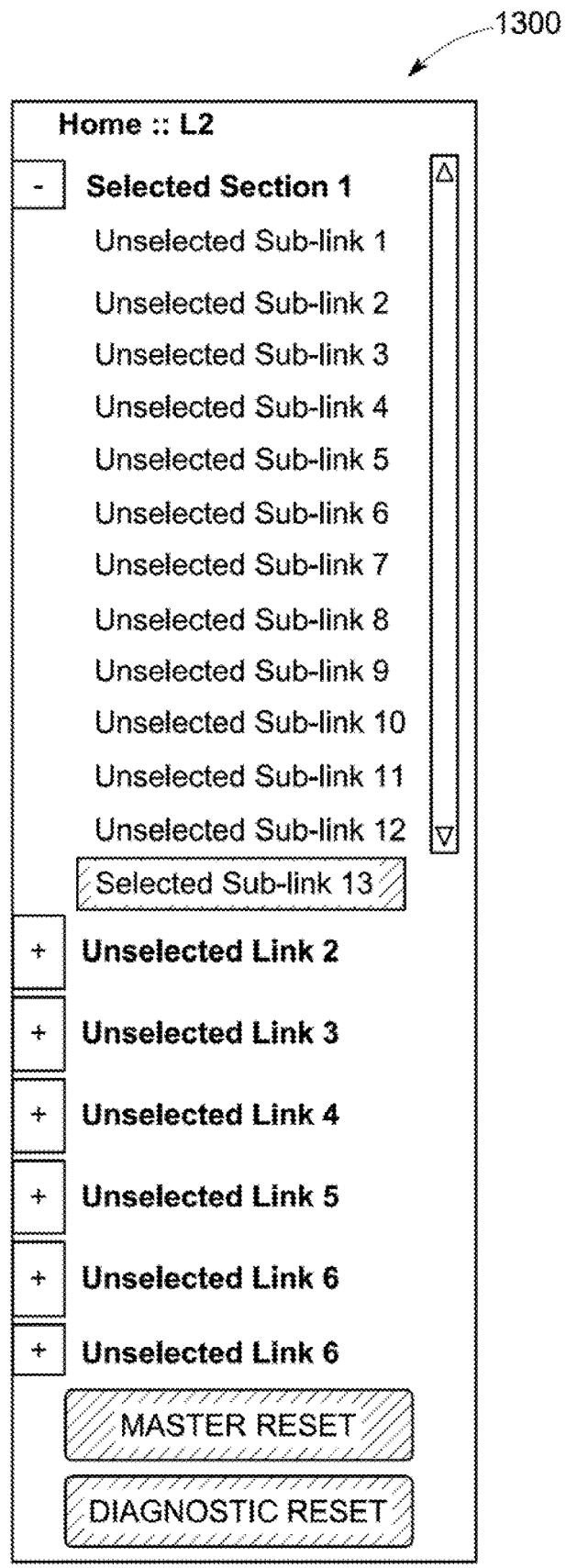

FIG. 13 is an example side bar navigation menu for a HMI, according to one embodiment of the disclosure.

Figure 14:
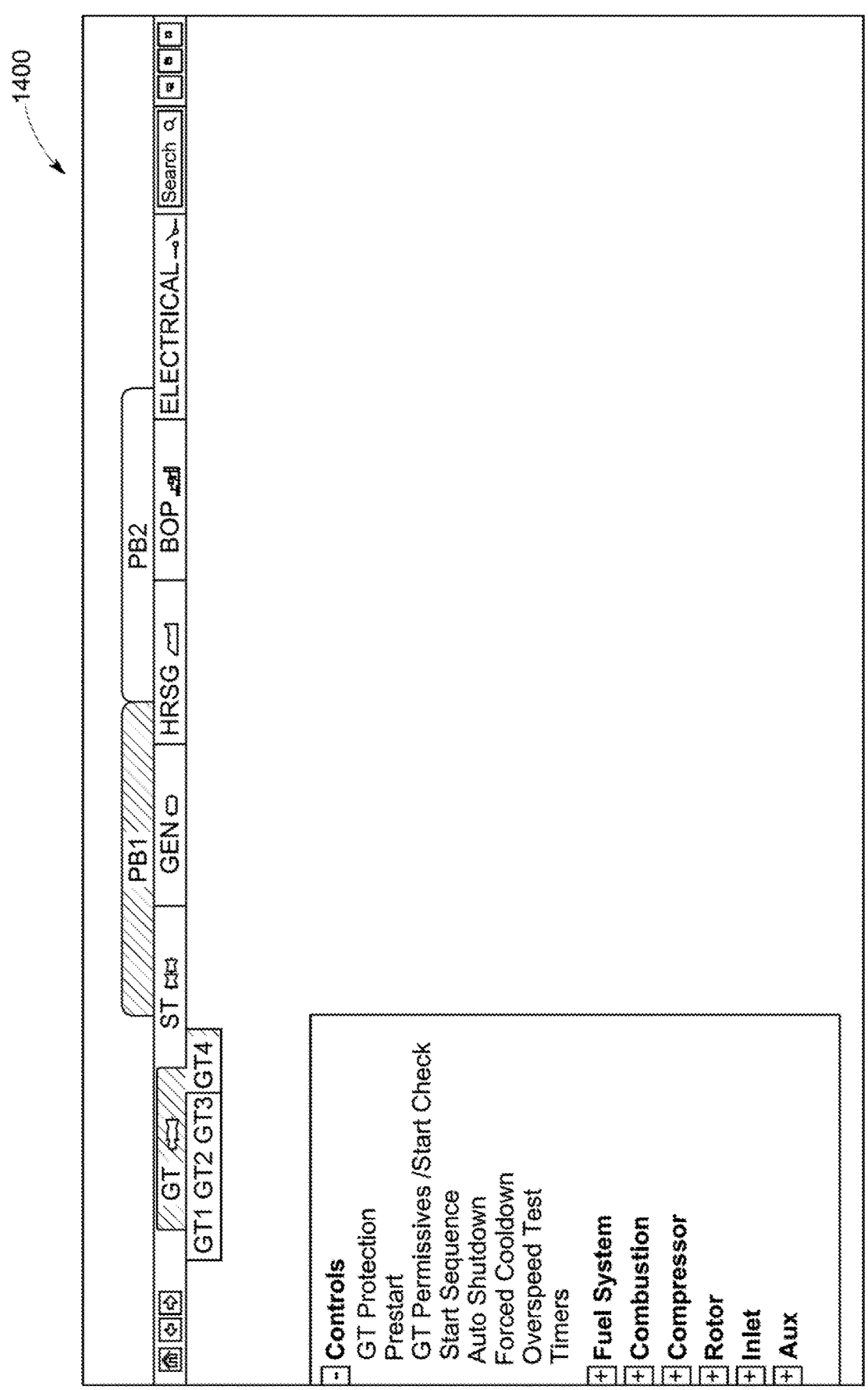

FIG. 14 is an example multi-unit, multi-block navigation menu for a HMI, according to one embodiment of the disclosure.

Figure 15:
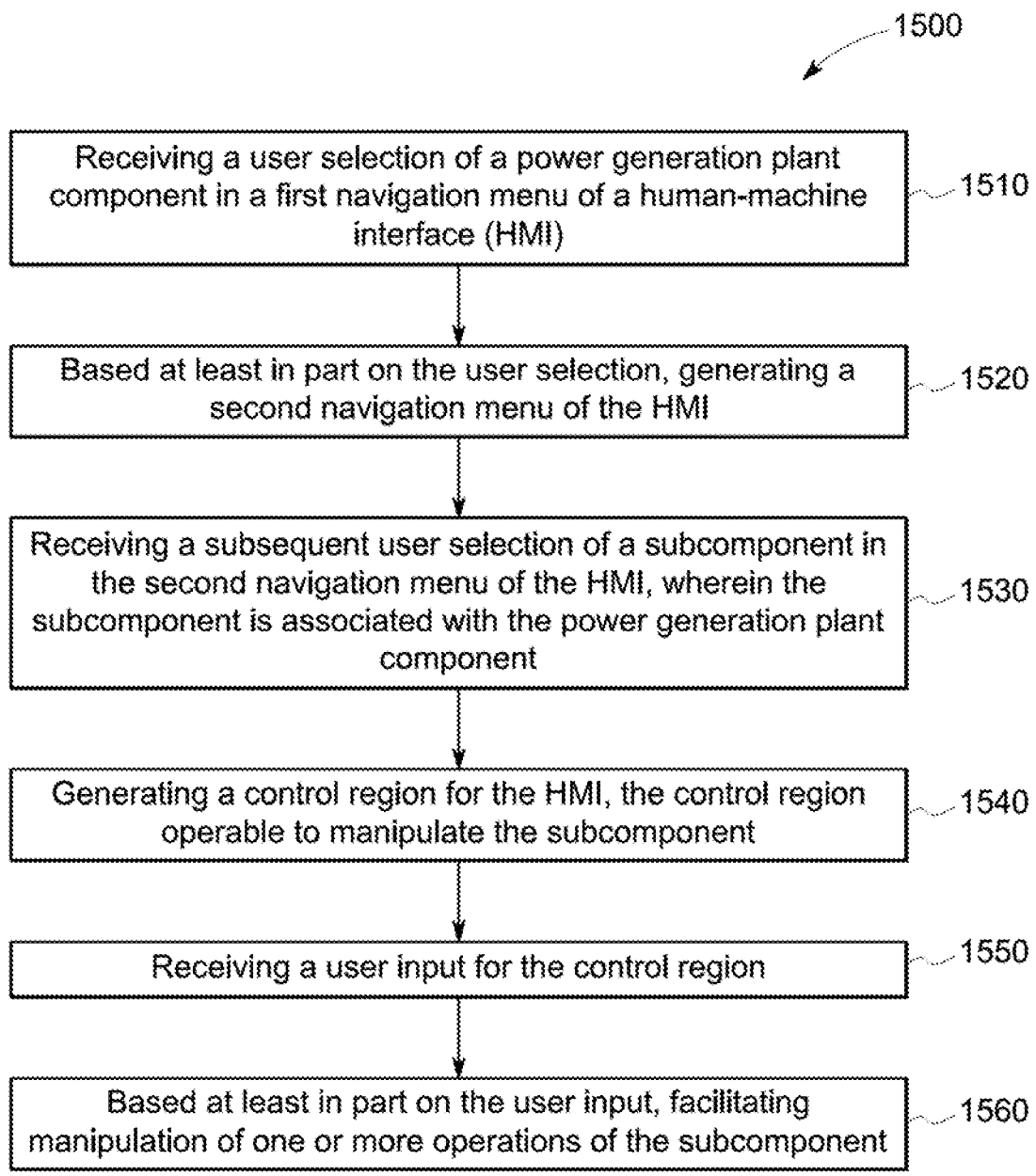

FIG. 15 is a flow diagram of an example method for controlling power generation plant operations via a HMI, according to one embodiment of the disclosure.

Figure 16:
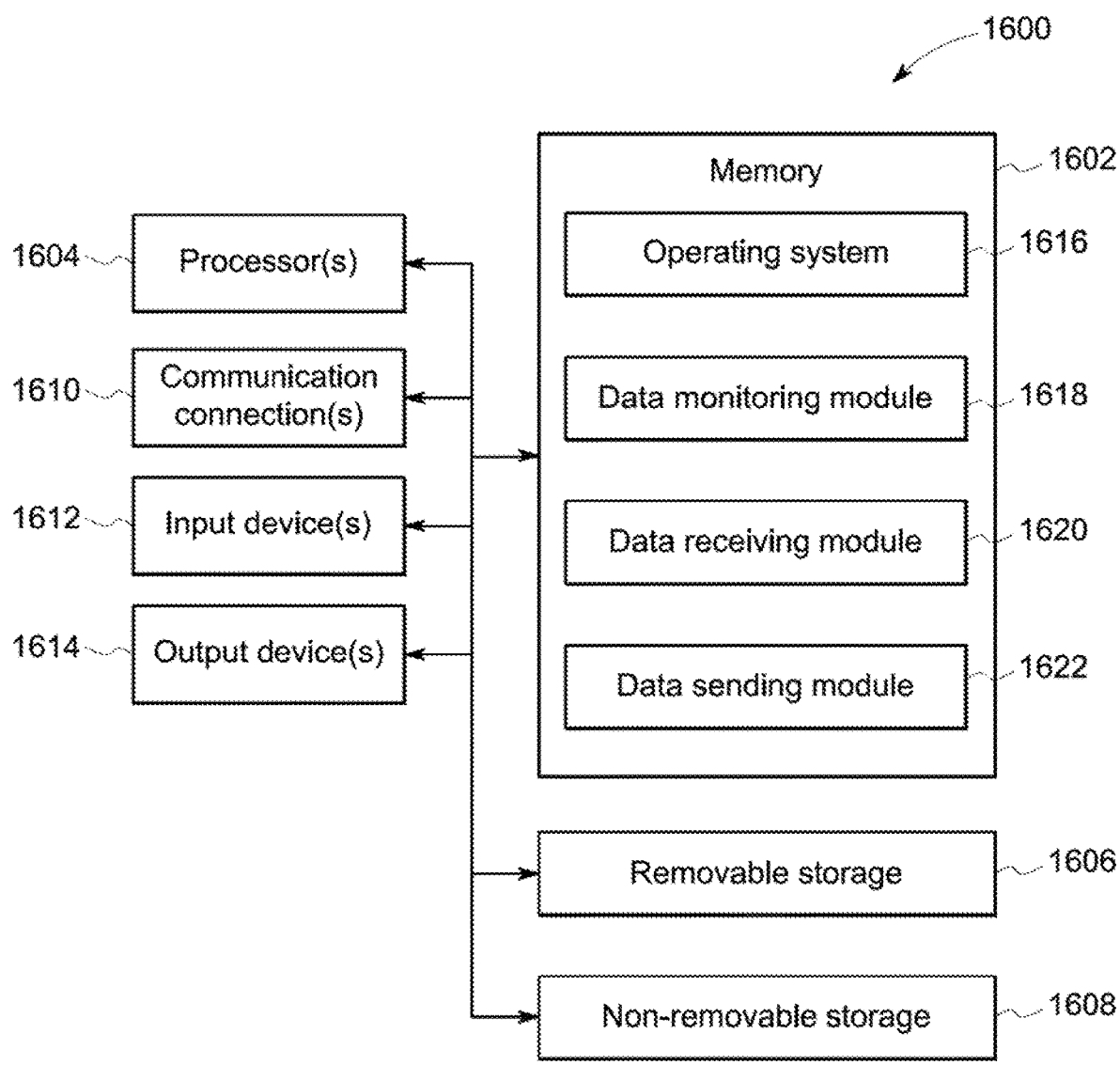

FIG. 16 is a block diagram of an example computing environment for a system for controlling power generation plant operations via a HMI, according to one embodiment of the disclosure.

DETAILED DESCRIPTION

Illustrative embodiments will now be described more fully hereinafter with reference to the accompanying drawings, in which some, but not all embodiments of the disclosure may be shown. The disclosure may be embodied in many different forms and should not be construed as limited to the embodiments set forth herein; rather, these embodiments are provided so that this disclosure will satisfy applicable legal requirements. As noted above, like numbers refer to like elements throughout.

Accordingly, certain embodiments of the disclosure are directed to, systems and methods for controlling power generation plant operations via a HMI. In certain other embodiments, a hierarchal presentation of screens, a navigation framework, and task-based screen interfaces for a power generation plant operator human-machine interface (HMI) can be provided. Further, certain embodiments can provide screen interfaces that are structured based on a four-level hierarchy (e.g., a system of layered screen interfaces that correspond to respective levels (e.g., Level 1 through Level 4) of detail and functionality contained in the screen). For example, Level 1 screen interfaces may displayed on a wall, while Level 2 to Level 4 screen interfaces may be displayed on a desktop monitor for operator interaction.

In certain instances, a layered approach may help users (e.g., operators, and/or the like) consume and interact with information at a level appropriate for their particular needs and/or to accomplish specific tasks. Further, in some instances, increased depth of a layered hierarchy of screens can facilitate increased detail and functionality of systems and/or information utilized by users. Additionally, a flattened navigational hierarchy presented in a global navigation menu may enable relatively quick movement between different screen interfaces for relatively quicker and more efficient user access to different pieces of information and/or controls.

In certain embodiments, a layered screen interface hierarchy, information architecture, and/or information layout may be generated based on logical processes of overall power generation. For example, a screen interface hierarchy may be based on one or more levels of abstraction of overall power generation processes as specified by one or more indicating key performance indicators (KPIs) used to define respective levels of abstraction. Each level of abstraction may have its intended types and levels of details of information and also intended operator interactions.

As such, certain embodiments may serve as a framework for a hierarchal power generation plant HMI system that may be applied to one or more (e.g., a fleet) power generation plants to bring consistency of display, navigation of critical information and/or controls. For example, screen interfaces of a first power generation plant's HMI system may closely resemble screen interfaces of a second power generation plant's HMI system. In this manner, an operator of a first power generation plant may be enabled to quickly navigate screen interfaces of a second power generation plant's HMI system if needed. Screen interfaces and/or layers of abstraction may also be customized on a plant-by-plant basis to meet the needs of each different power generation plant.

Referring now to the figures, FIGS. 1A-1H illustrate an example level-based hierarchy 100 of screen interfaces according to one embodiment of the disclosure. Each level is intended for a different use. A Level 1 screen interface, illustrated for convenience in FIGS. 1B and 1C, may cover a relatively large span of oversight with a carefully selected data set that can represent major processes in an overview. For example, a Level 1 screen interface may include an overall status of a power generation plant, various parameters of the power generation plant, and/or the like. As stated above, a Level 1 screen interface may be presented on a relatively large display device and/or projected on a relatively large surface such as a wall to enable multiple users (e.g., operators) to concurrently view information on the Level 1 screen interface. As screen levels get lower (e.g., from Level 2 screen interfaces to Level 4 screen interfaces), the span of control gets narrower and the level of detailed information gets finer. Level 2 screen interfaces to Level 4 screen interfaces may be presented to a single user to enable the single user to monitor one or more details of the power generation plant and/or accomplish a particular task. For example, a Level 2 screen interface, illustrated in FIGS. 1D and 1E, may be directed to a sub-system overview including a collection of features organized around a specific component (e.g., turbine, fan, compressor, generator, and/or the like) of the overall power generation plant, while a lower screen interface, such as Level 4 screen interface, illustrated in FIGS. 1F-1H, may be directed to controlling a particular parameter of a particular component (e.g., a temperature, a speed, and/or the like). However, each level will incorporate both system-centric and process-oriented elements. Specific characteristics of each level, examples of which are described in more detail below, are shown further below in FIG. 2.

Figure 1C:
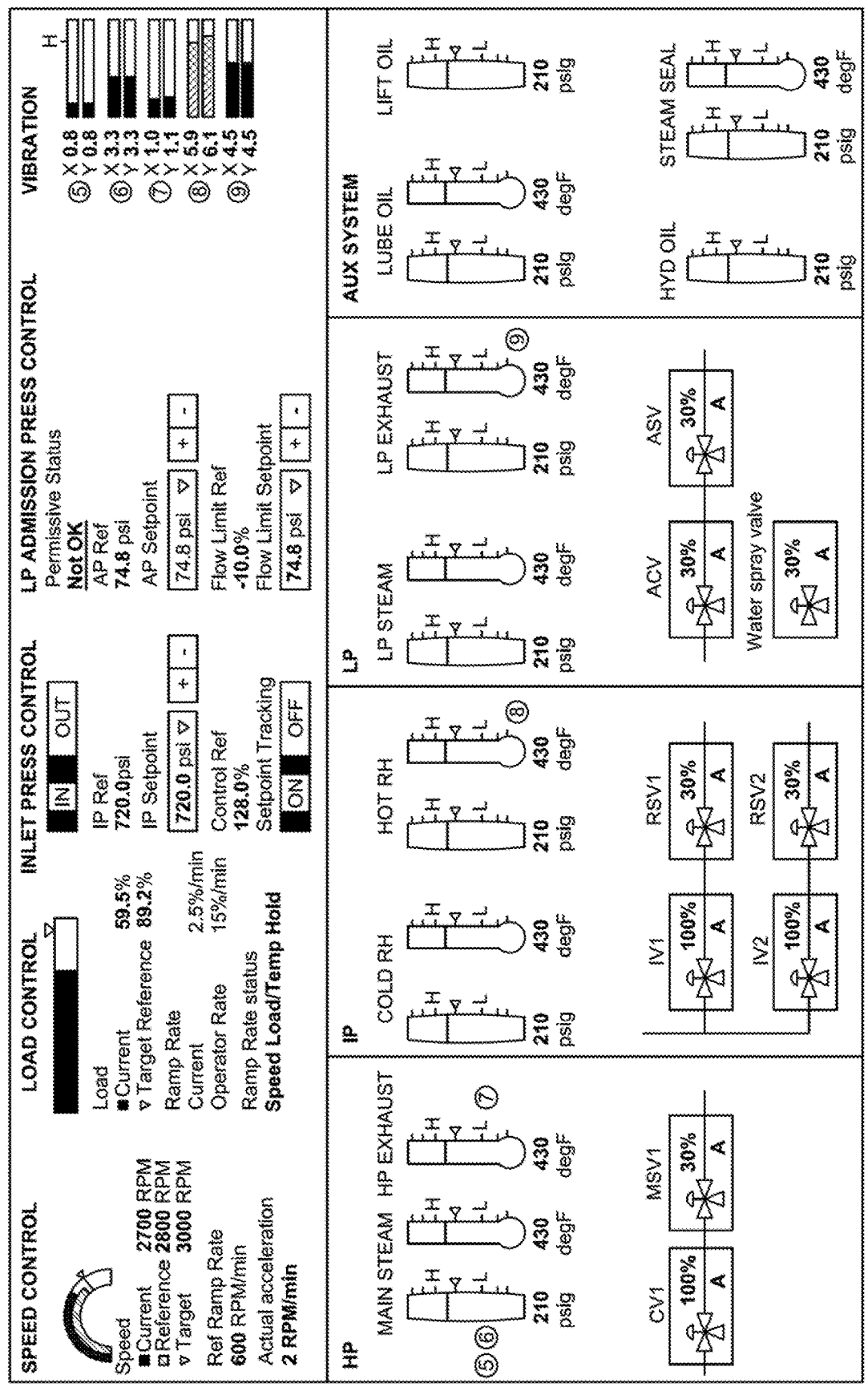
Figure 1G:
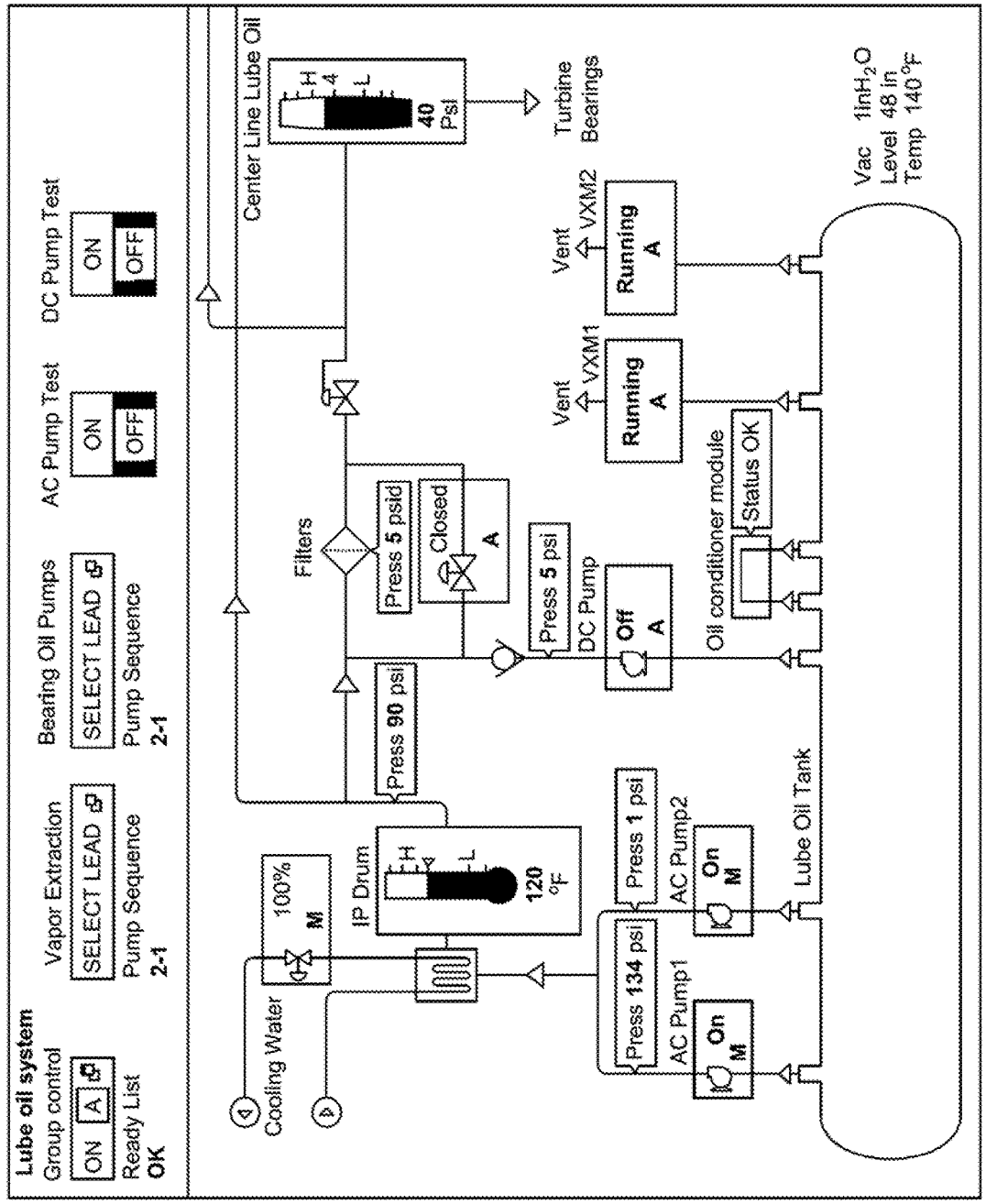
Figure 1H:
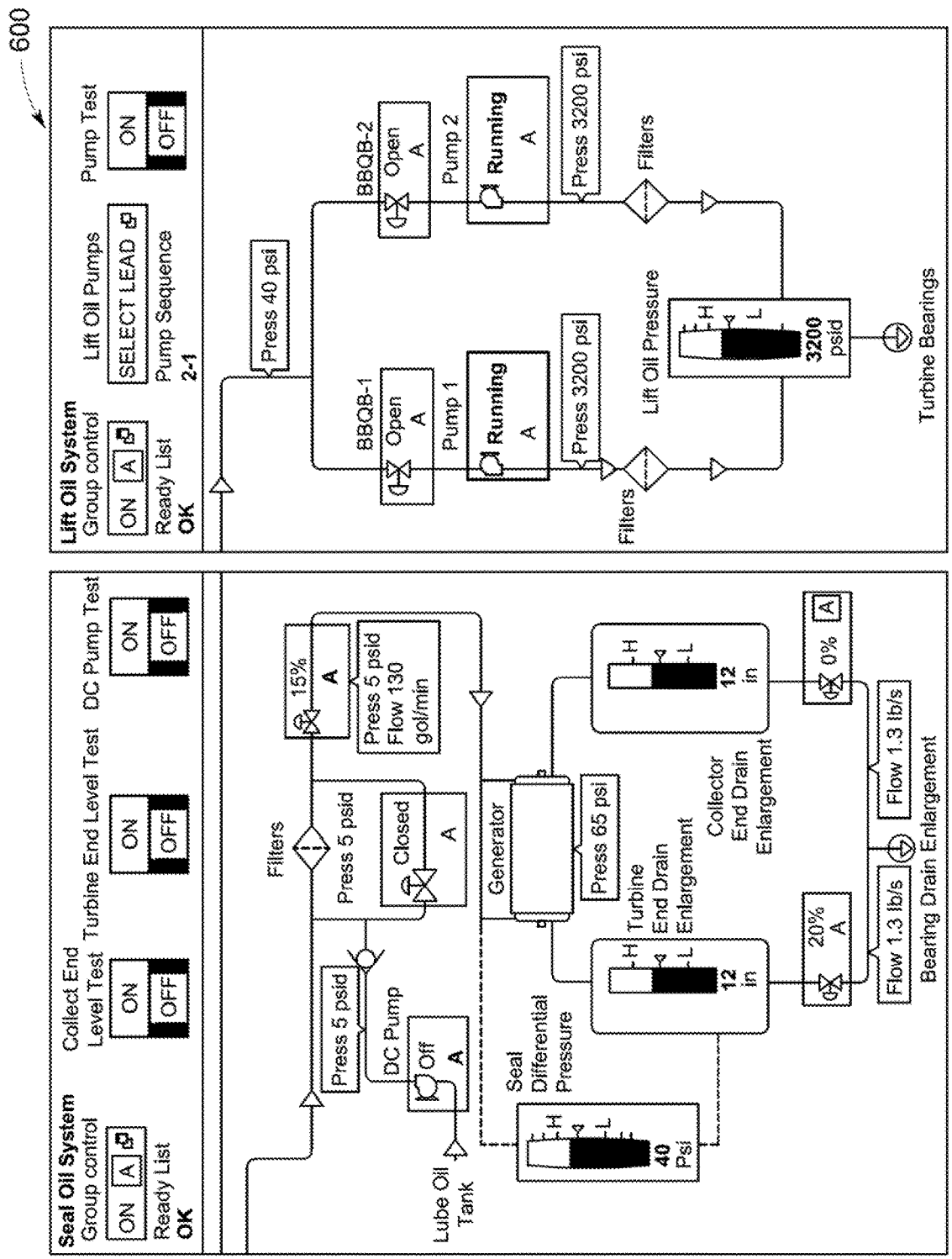
Figure 3:
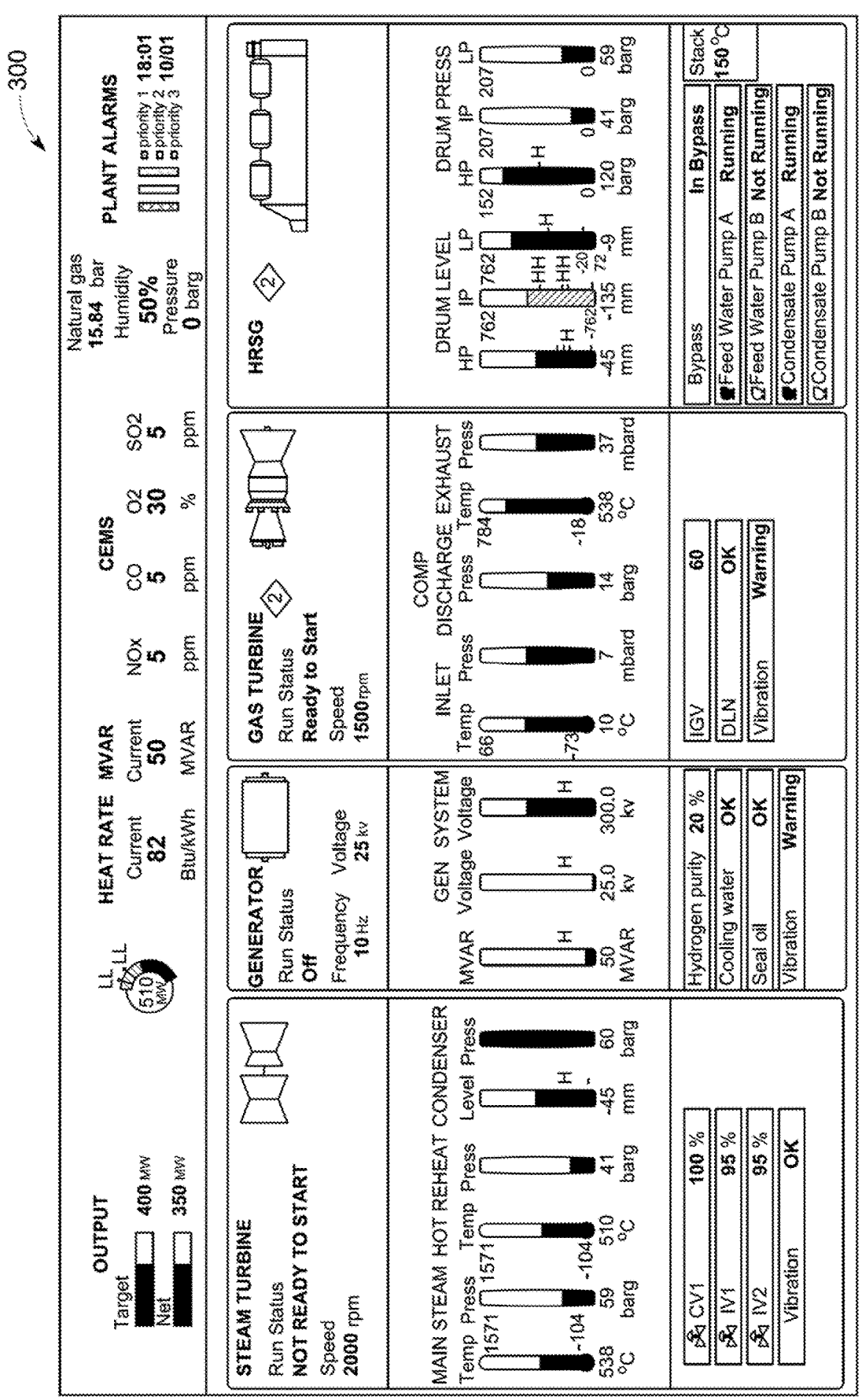
FIG. 3 is an example screen interface for a HMI, according to one embodiment of the disclosure.

Turning to FIG. 3, an example Level 1 screen interface 300 is illustrated according to one embodiment of the disclosure, including a plant overview of a power generation plant. Screen interface 300 may include a process area overview that covers an operator's entire span of control. Operators may be able to discern from screen interface 300 the overall operational condition of the plant, as well as overall operational conditions of various high-level components of the power generation plant. In some embodiments, a Level 1 screen interface, such as screen interface 300, may be designed so that some or all components of the power generation plant are compartmentalized for the power generation plant. For example, the plant overview screen interface 300 includes four compartments correlating to a steam turbine, a generator, a gas turbine, and a heat recovery stream generator (HRSG).

All Level 1 screen interfaces (and/or screen interfaces of other levels) may include a masthead to show plant-related parameters. Typically, plant-related parameters are illustrated on all Level 1 screen interfaces. In some embodiments, a Level 1 screen interface may be hosted on a large screen monitor in a control room of the power generation plant. While, Level 1 screen interfaces may not be designed for operator interaction, they may provide overview data on plant conditions and, thus, may be presented on a communal monitoring screen interface and/or projected surface. This large communal screen interface may be launched from the HMI (e.g., an operator's computing device, and/or the like) and could be included as an HMI screen interface level.

In some embodiments, a Level 1 screen interface is a process-oriented type of screen that covers an operator's entire span of control for a power generation plant. A Level 1 screen interface can typically provide an "at a glance" overall operational condition of a power generation plant and can present KPIs for plant operations, as well as most critical information that may impact operation of the power generation plant. In some instances, a Level 1 screen interface may not be controlled by an operator and may serve to enable operators to only consume information as opposed to modifying, inputting, and/or interacting with information. Operators may typically use this screen interface for grasping a relatively quick understanding of a plant status and/or of any abnormalities in plant operation.

Figure 4B:
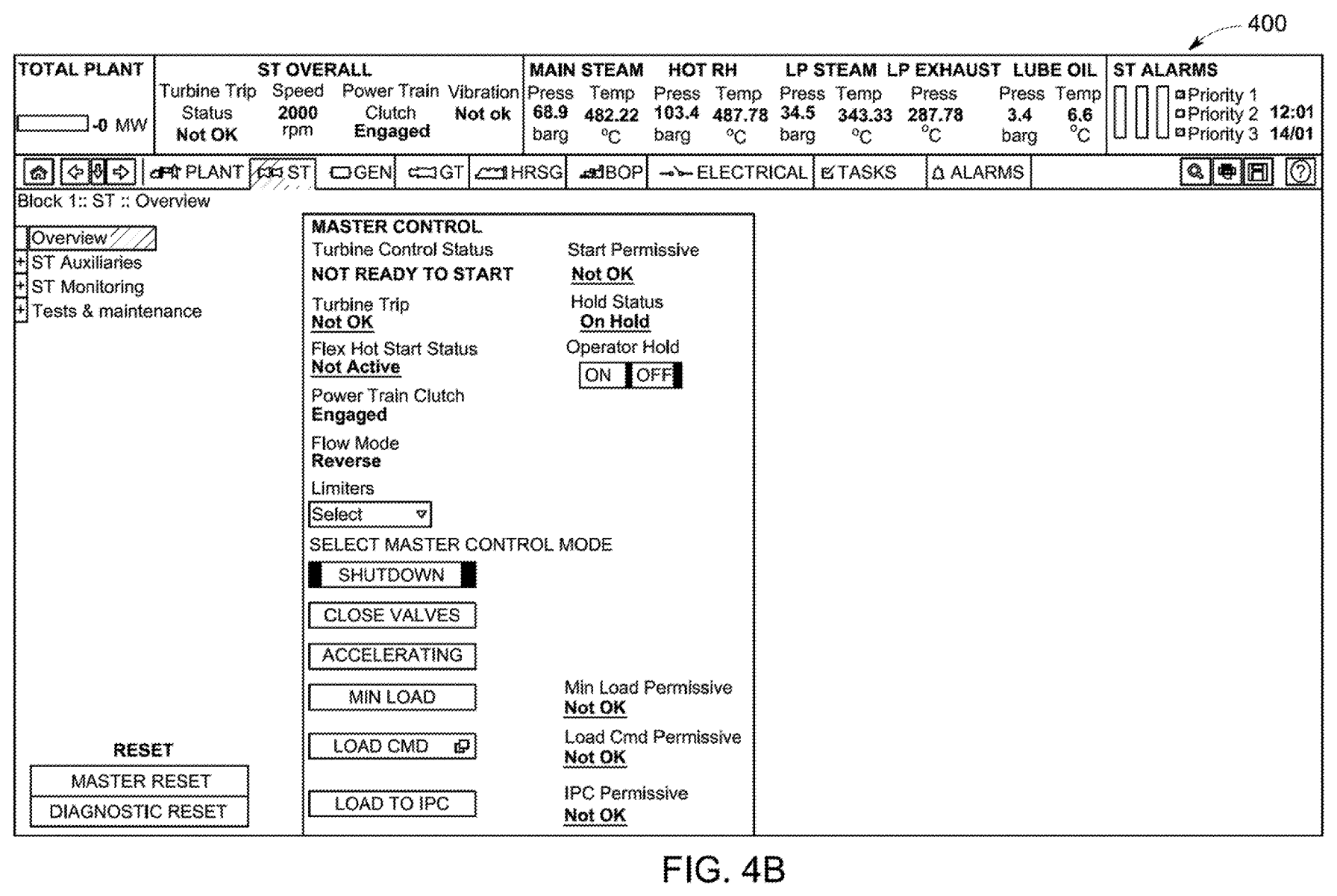
Figure 4C:
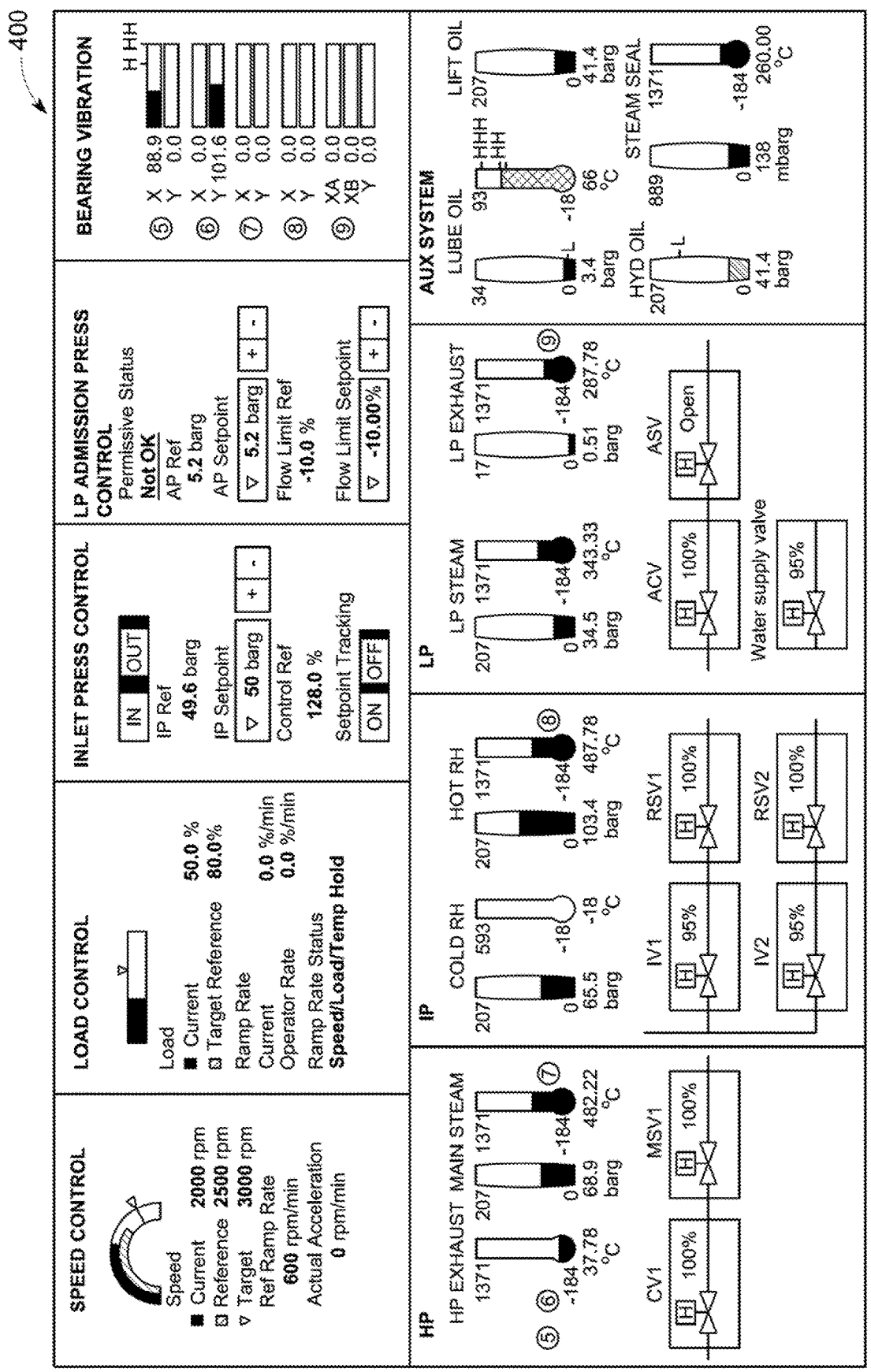

FIGS. 4A-4C depict an exemplary Level 2 screen interface 400 according to one embodiment of the disclosure. A Level 2 screen interface may be accessed and/or viewed by a user selection of a component included on a Level 1 screen interface, selection from a navigation menu, and/or the like. A typical Level 2 screen interface such as screen interface 400 shows the power generation system and/or a major piece of equipment (e.g., a component, a system unit, a steam turbine, a generator, a gas turbine, and a heat recovery stream generator (HRSG), and/or the like) for which an operator is responsible. In some embodiments, there may be a Level 2 screen interface that corresponds to each component of a power generation plant system. In some embodiments, a Level 2 screen interface may include some or all critical KPIs for controlling and/or monitoring of the component. For example, a steam turbine overview screen (e.g., screen interface 400) may enable an operator to start, stop, and/or load the steam turbine from this screen. Typically, all Level 2 screen interfaces can include groups of information based on a component's corresponding subsystems and may also include a system-wide masthead. Additionally, the masthead may also be included in all Level 3 and Level 4 screen interfaces for the same system. For example, some or all steam turbine screens may include a fixed masthead as shown in FIGS. 4A-6. Alternatively, the masthead may be non-fixed (e.g., moveable, modifiable, and/or the like), and may not be included on every screen interface (e.g., included on a subset and/or only particular screen interfaces).

Level 2 screen interfaces are typically process-oriented and/or system-centric (e.g., component-centric). In some embodiments, Level 2 screen interfaces can include information that an operator can modify, interact with, and/or the like. For example, Level 2 screen interfaces may include information for operators to perform control functions associated with the component and/or system and/or information associated with a component and/or system that an operator needs to relatively quickly recognize an abnormality in operation of the component and/or power generation plant system. Level 2 screen interfaces may further include control functions that an operator may use frequently. Operators may use Level 2 screen interfaces most of the time, and other users may primarily monitor operation of a power generation plant via Level 2 screen interfaces. In this manner, Level 2 screen interfaces can enable operators to perform routine control tasks.

Figure 5B:
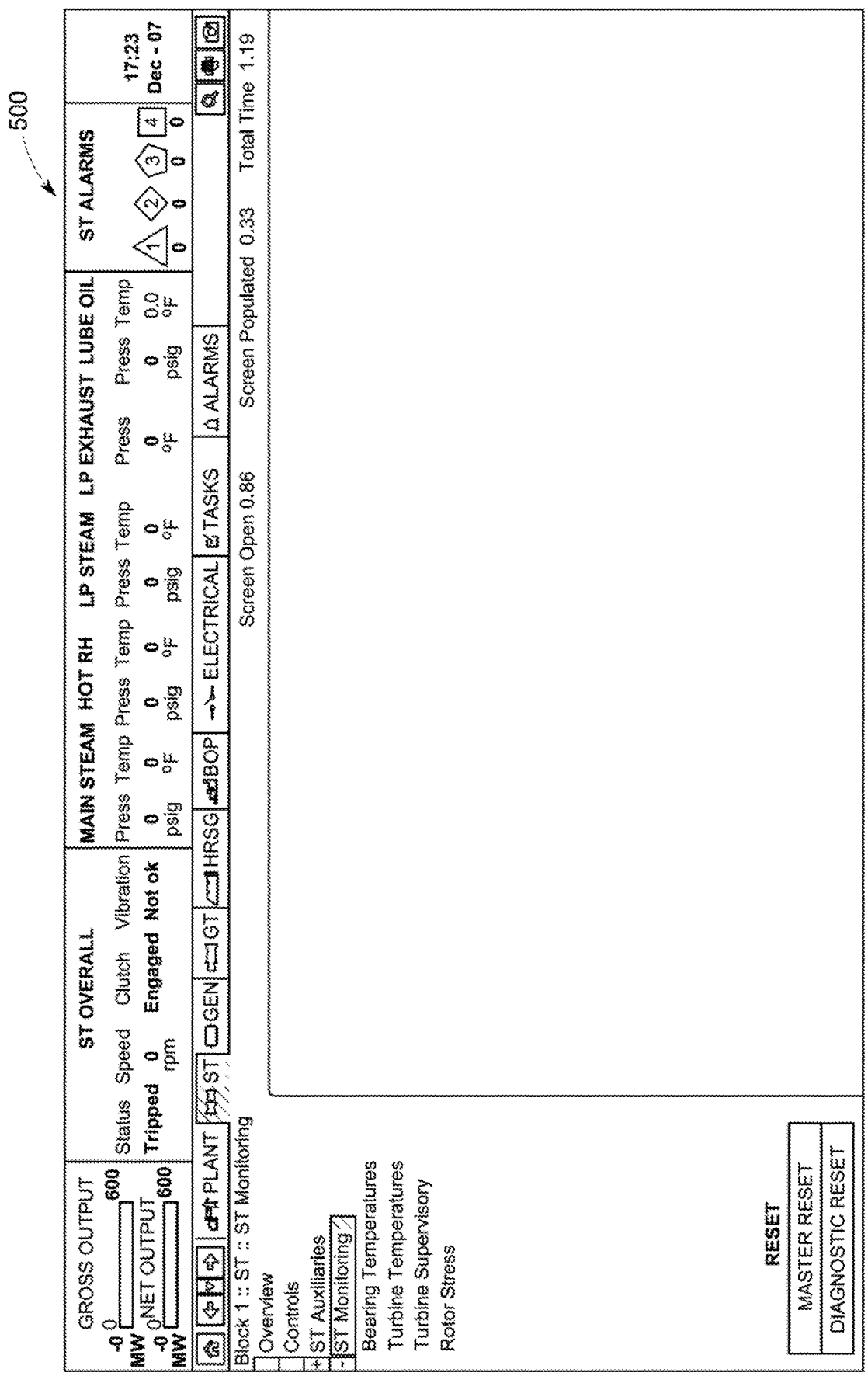
Figure 5C:
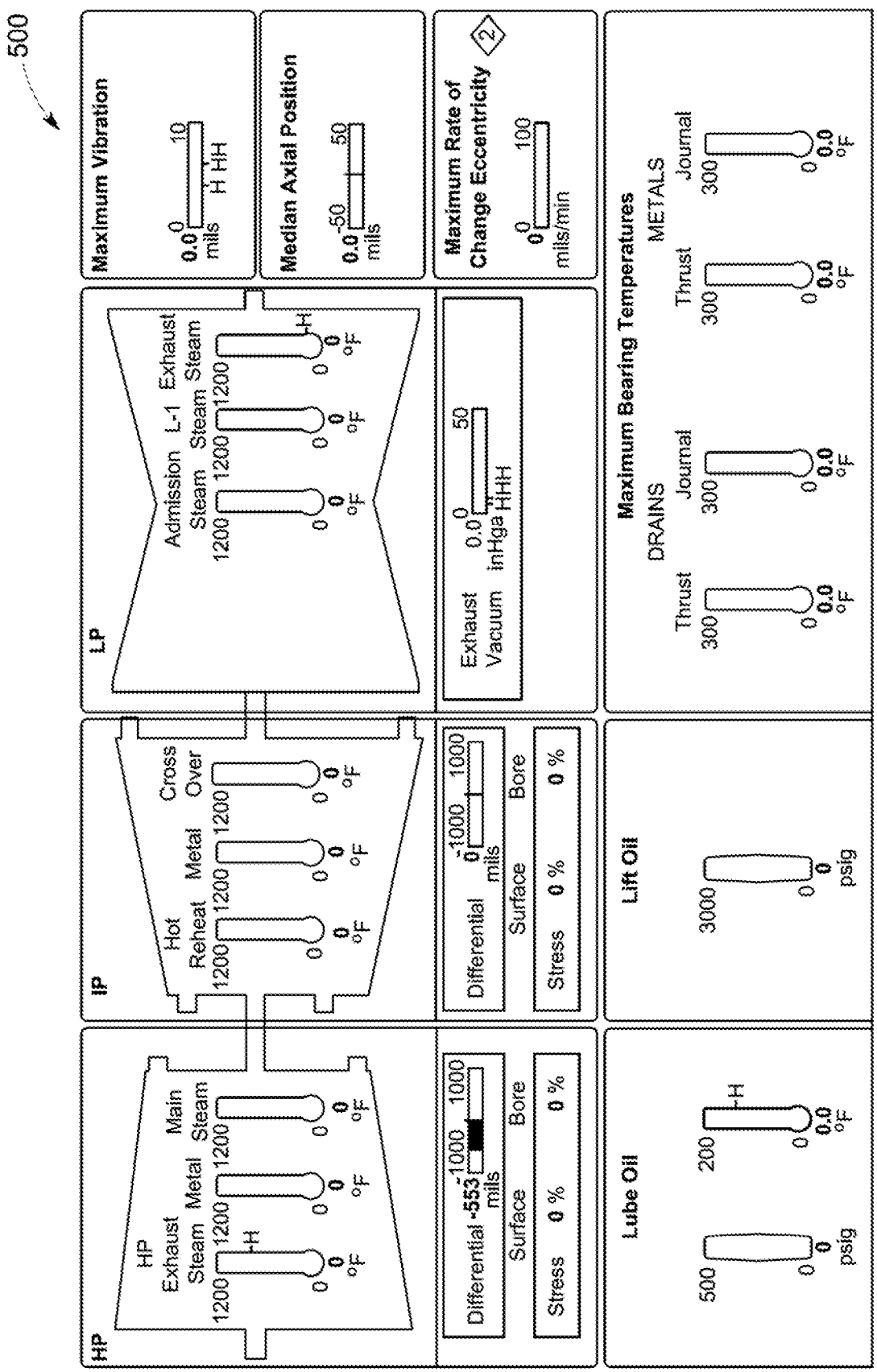
Figure 6B:
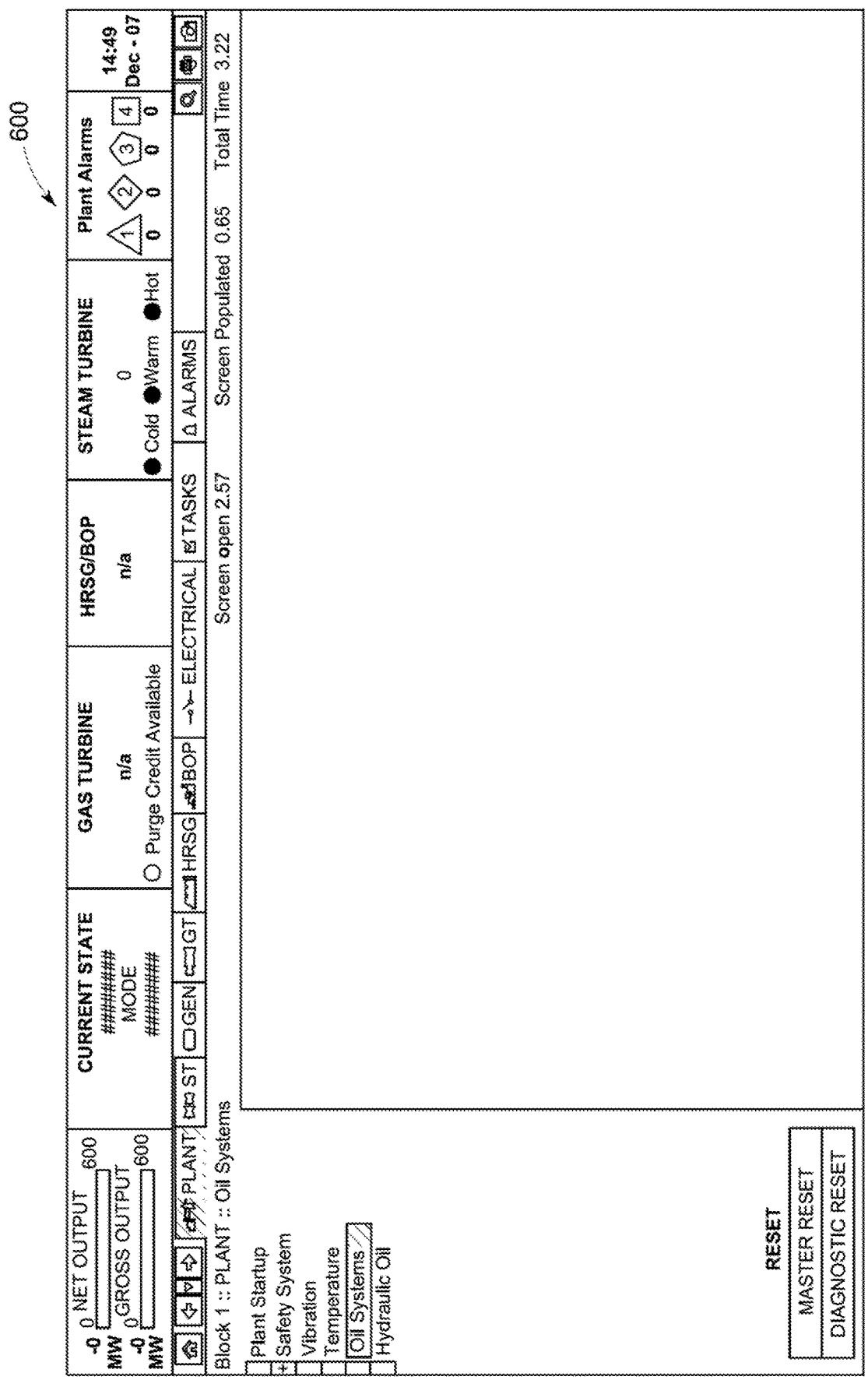
Figure 6C:
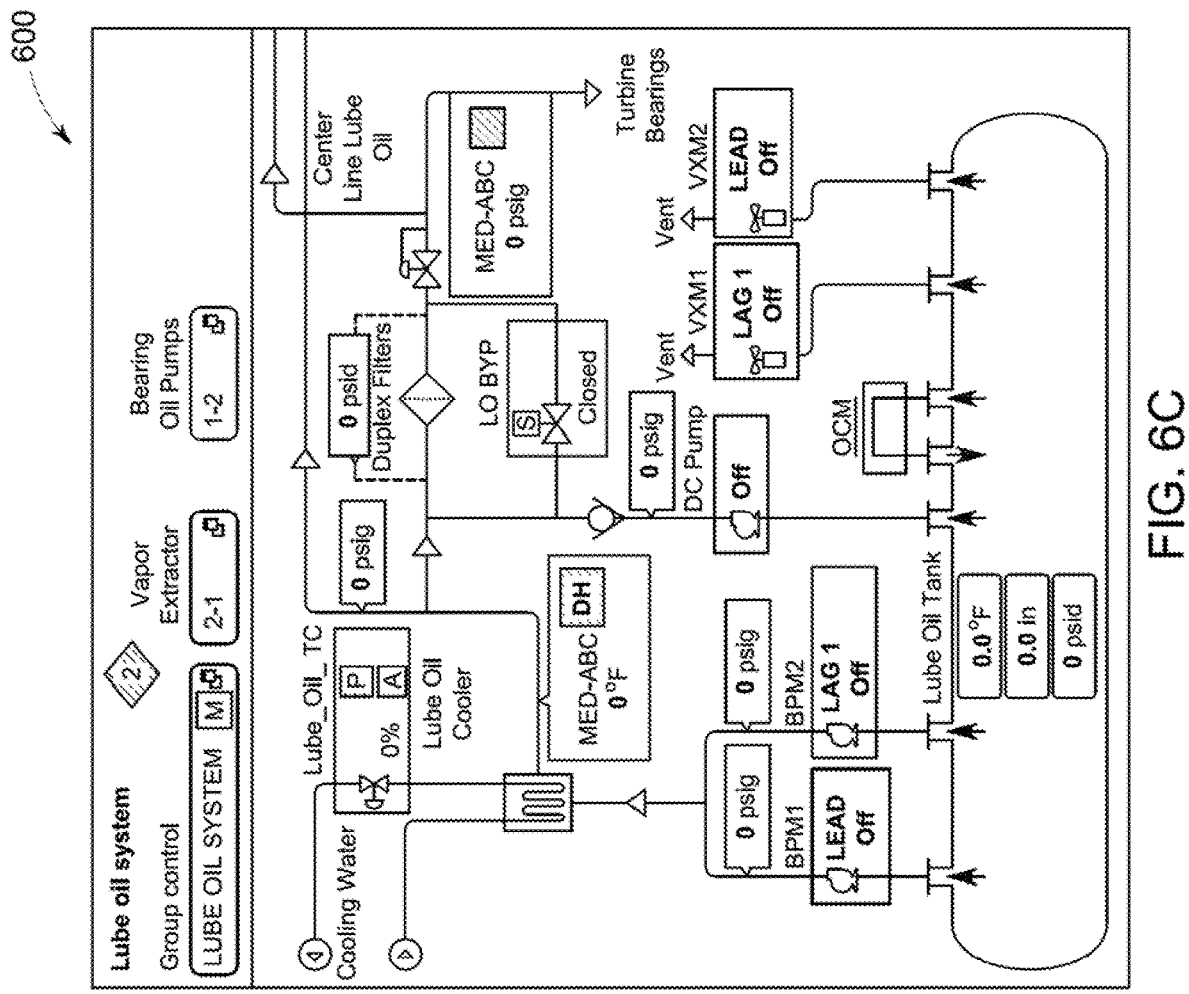
Figure 6D:
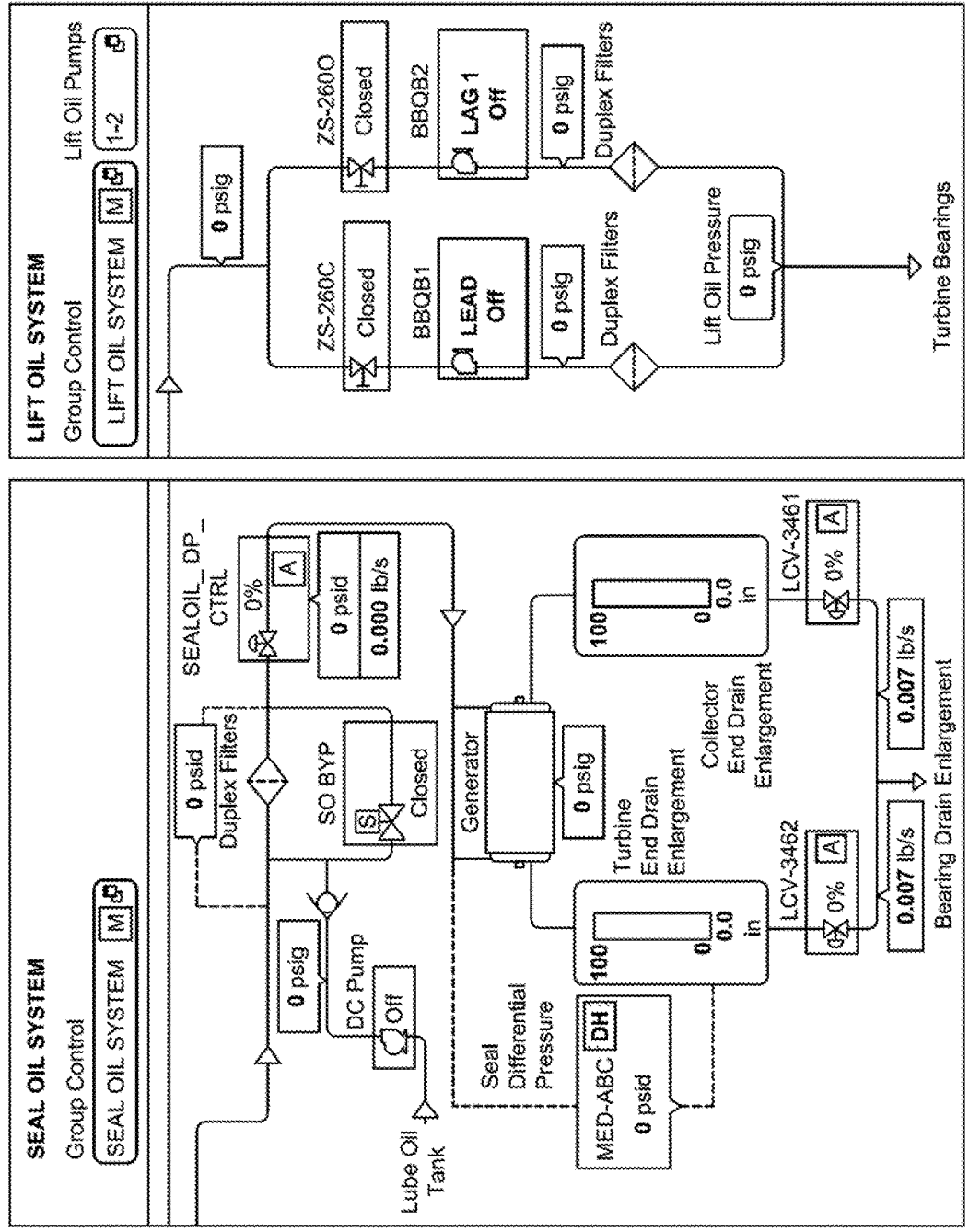

FIGS. 5A-5C illustrate an example Level 3 screen interface 500. Typically, Level 3 screen interfaces can be accessed upon selection of one or more subsystems of a system and/or component presented in a Level 2 screen interface, upon selection from a navigation menu, and/or the like. Level 3 screen interfaces can present system graphics that may serve as overview screens for each subsystem related to Level 2 components. Level 3 screen interfaces may include details about a single subsystem, a piece of equipment, a process control scheme, and/or the like. Level 3 screen interfaces may be used to display and/or control specific detailed information related to a subsystem. For example, a steam turbine monitoring system screen 500 shown in FIGS. 5A-5C is a Level 3 screen interface related to monitoring of critical steam turbine temperatures and vibrations. The screen interface 500 may also be compartmentalized based on multiple subsystems such as high pressure (HP), intermediate pressure (IP), and low pressure (LP) sections. Information that illustrates an overall status of each system can be presented in Level 3 screen interfaces.

Level 3 screen interfaces, typically process-oriented and/or system-centric (e.g., component-centric), may be limited to a sub-component and/or a subsystem of a component and/or system or a process. In some embodiments, Level 3 screen interfaces include information that an operator can modify, interact with, and/or the like. Information that is needed for operators to perform any control functions can be included in the screen interface. Level 3 screen interfaces may include control actions for substantially random and/or rare use only (e.g., transferring fuels, swapping certain pumps, and/or the like). Operators typically use Level 3 screen interfaces when a particular subprocess or subsystem (e.g., subcomponent) needs focused attention. In some embodiments, operators may perform routine control tasks using Level 3 screen interfaces and/or faceplates accessible on the screen interfaces.

FIGS. 6A-6D illustrate an example Level 4 screen interface 600 according to one embodiment of the disclosure. Level 4 screen interfaces can typically provide support graphics and may be equipment support and/or diagnostic displays. For example, Level 4 screen interfaces may show such items as interlocks, emergency shutdown test screens, and diagnostic screens. Level 4 screen interfaces may generally embody one or more faceplates and/or piping and instrumentation diagrams (P&IDs) with support and diagnostic information. When a P&ID is used with a Level 4 screen interface, the layout may be consistent with a process flow (e.g., a flow chart directed from left to right and top to bottom).

Level 4 screen interfaces, typically system-centric (e.g., component-centric), may include a certain amount of process-initiating controls/contents and component level information. Typically, Level 4 screen interfaces can be accessed upon selection of one or more details of a subsystem of a system and/or component presented in a Level 3 screen interface, upon selection from a navigation menu, and/or the like. Level 4 screen interfaces may include the narrowest span of view and/or control in the HMI system. Information included in Level 4 screen interfaces may include a P&ID-view style that reflects a process relationship among equipment and components in an abstracted level, information that an operator can modify, interact with, information that calls for an operator to perform control functions, and/or the like. Level 4 screen interfaces may include operator control actions for monitoring some or all equipment, components, and/or the like during operation of the power generation plant. Operators may use Level 4 screen interfaces to troubleshoot, diagnose, and/or resolve any number of abnormal situations. In some embodiments, operators may use Level 4 screen interfaces to check, confirm, and verify the most detailed level of information associated with the power generation plant and/or a component of the plant. Further, operators may perform specific troubleshoot tasks using Level 4 screen interfaces and using faceplates accessible on Level 4 screen interfaces.

FIGS. 7A-7C illustrate an exemplary task-based screen interface 700 according to one embodiment of the disclosure. Task-based screen interfaces may be accessed using a navigation menu and/or navigation bar. For example, a "Task" tab in a top tab navigation bar may be used by the operator to navigate and perform tasks related to plant operation. For example, task-based screen interface 700 can illustrate a sequence of operations related to a plant startup. An operator may select a tab to see a list of each critical task included on Level 3 screen interfaces. Tasks like plant startup, shutdown, and/or the like shall be incorporated in a navigation schema under the "Task" tab so that an operator may directly view these task-specific screen interfaces to enable actions associated with executing a desired task. Typically, task-based screen interfaces are Level 3 screen interfaces or, if there are sub-levels in a Level 3 screen interface, Level 4 screen interfaces can be created in the navigation schema.

As depicted in FIGS. 8-14, the HMI may include a navigation schema designed with at least two sections according to an embodiment of the disclosure. For example, the navigation schema may include a navigation home screen interface (e.g., screen interface 800 in FIG. 8) as one screen and a tab and bar navigation menu for each HMI screen interface (e.g., screen interfaces 900-1400 in FIGS. 9-14). In some embodiments, and as depicted in FIGS. 9-14, navigation control may be an inverted "L" shaped control menu in which a tap navigation control (e.g., a selection) specifies a Level 2 control (e.g., selecting a component). Selection of a component would open a respective Level 3 overview screen interface for each subcomponent of the selected component. Additionally, a selection shall simultaneously change the bar navigation control so respective Level 3 and Level 4 screen interfaces for an individual component and/or subcomponent are available to an operator for navigation.

Each HMI configuration can include a main navigation home screen interface 800 that includes a link to some or all screen interfaces as seen in FIG. 8. A home screen interface 800 may be provided as a single screen interface from which a user (e.g., an operator) may navigate to any other screen in the HMI control system. In this manner, the home screen interface 800 may list all Level 2 through Level 4 screen interfaces so that a user is enabled to navigate to any screen interface. Apart from the home screen interface 800, a standard navigation control may be included on each screen interface of the HMI control system. Further, a "Home" icon may be included on each screen interface so that user can go to the home screen interface 800 with a single input device action, such as a single click of a mouse or other input device.

A tab navigation menu may be included at the top or upper portion of each screen interface so as to enable a user (e.g., an operator) to access and/or view each Level 2 screen interface. FIG. 9 depicts 9 example tab navigation menus according to one embodiment of the disclosure. The tab navigation menu may be organized by the main components (e.g., systems) of the power generation plant and may also include tasks associated with monitoring, maintaining, controlling, and/or operating components and/or the power generation system as a whole. Selection of a tab from the tab navigation menu typically navigates the user (e.g., operator) to a Level 2 overview screen interface for a component associated with the selected tab. In some embodiments, selection of a "Home" icon included in the tab navigation menu overlays the home screen interface 800 over any currently-viewed screen. Selection (e.g., click) of a "Forward" icon included in the tab navigation menu may navigate the user to a next screen in forward history of screens that was navigated by the user. Alternatively, a held selection (e.g., click and hold) of the "Forward" icon may display a maximum number of screen interfaces included in a forward history of screen interfaces that were navigated by the user. Selection (e,g., click) of a "Backward" icon included in the tab navigation menu may navigate the user to a next screen interface in backward history of screen interfaces previously navigated by the user. Alternatively, a held selection (e.g., click and hold) of the "Backward" icon may display a maximum number of screen interfaces included in a backward history of screen interfaces previously navigated by the user. An exemplary navigation menu screen interface 1000 is depicted in FIGS. 10A-10D according to one embodiment of the disclosure. Additionally, the HMI system may generate a list of screens viewed, visited, and/or accessed, and/or the like by the user (e.g., operator). In this manner, the user may be enabled to select a screen included in the list and navigate to a recently-viewed screen. In some embodiments, the list of screens may embody a breadcrumb navigation list positioned directly under the tab navigation menu.

Navigation of Level 3 and Level 4 screen interfaces may be located in a side bar navigation menu. As depicted in FIGS. 11-14, the side bar navigation menu may include a link to each subcomponent and/or subsystem (e.g., auxiliaries, monitoring, and/or the like) within a selected component (e.g., a component selected from the tab navigation menu). Each subcomponent and/or subsystem may be included in a side bar navigation menu list that can be expanded and/or collapsed to show and/or hide Level 4 screen interfaces using a "+" sign and/or a "−" sign next to the link to expand and/or collapse the list as shown in menus 1100 and 1200 FIGS. 11 and 12. When a Level 3 screen interface does not have any corresponding Level 4 screen interfaces, the Level 3 screen interface may be displayed in the list without a "+" sign as shown in FIG. 12. Additionally, a scroll bar may appear when the list extends beyond a predetermined screen interface window range, as shown in example side navigation menu 1300 of FIG. 13 according to one embodiment of the disclosure.

Each Navigation item on any level can be configured using a configuration feature available in each navigation object. This feature may enable configuration of the screen interface for each navigation item. The home screen interface can also be configured using similar controls.

The navigation schema may include multi-variable configuration navigation as depicted by screen interface 1400 of FIG. 14 according to one embodiment of the disclosure. The control may be scaled to include multiple units and/or blocks so that a user can navigate from any screen interface in a unit and/or block to any other screen in a different unit and/or block. Unit variables may be passed, transmitted, and/or shared to enable use of only one set of screen interfaces for different units with a similar configuration.

In some embodiments, the HMI may determine a current screen interface that the user is viewing, particularly if that screen interface is opened and/or overlaid externally (e.g., bypassing navigation). Additionally, navigation may be able to pass variables defined as appropriate to the unit. The HMI may also identify a screen interface based on a screen interface file, variables, and/or the like and display its tree path and/or node path. If a screen interface is not identified, the navigation display may only display a top node and/or level screen (e.g., leave all sublevels and/or nodes blank. Examples of bypassing navigation include various file explorers, an object configured to overlay a screen interface, a workstation alarm viewer, and/or the like.

The navigation may be able to be configured with an exclude list at any node and/or tree level. An exclude list may include a list of HMIs. In certain instances, an HMI whose name is present on the exclude list of a node/tree may not display the excluded node/tree. In this manner, the HMI control system may control which applications, screens, and/or the like may be overlaid and/or accessed when viewing one or more screen interfaces using the HMI. Further, the navigation may include one or more devices or controls for displaying its configuration in a tree view that shows the tree hierarchy. The user may be permitted to select a button and/or a node in a tree view to navigate to a screen interface. Moreover, the HMI may define a particular color structure, color palate, one or more fonts, font sizes, alarms, icons, buttons, and/or the like.

Additionally, each level of screens may include one or more background graphics. In some embodiments, background graphics may be unique to each level of screens. Alternatively, multiple levels may share similar background graphics. In this manner, different background graphics may be included on screens of different levels to enable the user (e.g., operator) to quickly identify which level of screen is associated with a currently-viewed screen. Furthermore, various background graphics may be included on screens associated with different components and/or subcomponents of the power generation plant to enable the user to quickly identify which component and/or subcomponent (or process, parameter, and/or the like) is currently being viewed, and with which component and/or subcomponent the current screen is associated.

FIG. 15 is a flow diagram illustrating details of an example method 1500 for controlling power generation plant operations using a human-machine interface (HMI), according to one embodiment of the disclosure. At block 1510, the method 1500 can include receiving a user selection of a power generation plant component in a first navigation menu of a human-machine interface (HMI). At block 1520, the method 1500 can include based at least in part on the user selection, generating a second navigation menu of the HMI. At block 1530, the method 1500 can include receiving a subsequent user selection of a subcomponent in the second navigation menu of the HMI, wherein the subcomponent is associated with the power generation plant component. At block 1540, the method 1500 can include generating a control region for the HMI, the control region operable to manipulate the subcomponent. At block 1550, the method 1500 can include receiving a user input for the control region. At block 1560, the method 1500 can include based at least in part on the user input, facilitating manipulation of one or more operations of the subcomponent.

FIG. 16 is a block diagram of an example computing environment 1600 for a system for controlling power generation plant operations via a human-machine interface, according to one embodiment of the disclosure. The computing environment 1600 can include one or more devices, which can include a processor 1604 capable of communicating with a memory 1602. The processor 1604 may be implemented as appropriate in hardware, software, firmware, or combinations thereof. Software or firmware implementations of the processor 1604 may include computer-executable or machine-executable instructions written in any suitable programming language to perform the various functions described.

A memory 1602 can store program instructions that are loadable and executable on the processor 1604, as well as data generated during the execution of these programs. Depending on the configuration and type of computing environment 1600, a memory 1602 may be volatile (such as random access memory (RAM)) and/or non-volatile (such as read-only memory (ROM), flash memory, etc.). In some embodiments, the devices may also include additional removable storage 1606 and/or non-removable storage 1608 including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, the memory 1602 may include multiple different types of memory, such as static random access memory (SRAM), dynamic random access memory (DRAM), or ROM.

The memory 1602, removable storage 1606, and non-removable storage 1608 are all examples of non-transitory computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computing environment 1600 may also contain one or more communication connections 1610 that allow the devices to communicate with devices or equipment capable of communicating with a computing device. The connections can be established via various data communication channels or ports, such as USB or COM ports to receive connections for cables connecting the devices, e.g., control devices, to various other devices in a system. Devices can include communication drivers such as Ethernet drivers that enable the devices to communicate with other devices. According to various embodiments, the connections 1610 may be established via a wired and/or wireless connection. The computing environment 1600 may also include one or more input devices 1612, such as a keyboard, mouse, pen, voice input device, gesture detection or capture device, and touch input device. It may also include one or more output devices 1614, such as a display screen, printer, and speakers.

For example, the computing environment 1600 may process one or more user inputs (e.g., user selections via one or more screens of the HMI) received by the one or more input devices 1612. Processing the one or more user inputs may include determining and/or identifying one or more parameter values associated with the power generation plant and/or a component or subcomponent of the plant, calculating one or more parameter values, generating one or more graphics for display of information, and/or the like. Additionally, the computing environment 1600 may transmit and/or output the one or more inputs (either prior to or after processing) to the one or more output devices 1614 (e.g., display monitors configured to display one or more screens of the HMI, a projector and/or projection screen, and/or the like). In this manner, user inputs associated with operator (e.g., user) interaction with one or more screens of the HMI may be processed and/or outputted for display and/or presentation to the operator (e.g., user). The computing environment 1600 may further generate one or more screens of the HMI using the one or more output devices 1614.

In other embodiments, however, non-transitory computer-readable communication media may include transitory and/or non-transitory computer-readable instructions, program modules, or other data transmitted within a data signal, such as a carrier wave, or other transmission. As used herein, however, non-transitory computer-readable storage media does not include non-transitory computer-readable communication media.

Turning to the contents of the memory 1602, the memory 1602 can include, but is not limited to, an operating system (OS) 1616 and one or more application programs or services for implementing the features and aspects disclosed herein. Such application or services can include a data monitoring module 1618, a data receiving module 1620, and a data sending module 1622. In one embodiment, the modules 1618, 1620, and 1622 can be implemented by software that is provided in configurable control block language and is stored in non-volatile memory.

In one embodiment, the OS 1616 can include a QNX® real-time, multitasking operating system. The data monitoring module 1618 can monitor multiple devices, components, systems, subcomponents, subsystems, units, and/or the like of a power generation plant for data (e.g., information associated with a power generation plant, parameter values, and/or the like). In one embodiment, each of the devices can be monitored by a control device executing program code for the data monitoring module 1618. Each control device can also be configured to monitor data from the same, fewer, or more of the devices such that each control device can receive data from each of the devices. In addition to devices, the data monitoring module 1618 may also monitor data from other devices, such as control devices or other computing devices.

Certain embodiments herein relate to communication between devices that may or may not be configured for safety integrity level (SIL). As used herein, SIL can relate to a target level of risk reduction associated with the performance of devices. In one embodiment, both SIL and non-SIL devices can be monitored by control devices. For example, control devices that may not be configured for SIL can receive data from devices that may be configured for or not configured for SIL.

The data receiving module 1620 can receive data from the devices. In one embodiment, a control device executing the data receiving module 1620 can receive the data that were being monitored by the data monitoring module 1618 at the control device. The data can include various data, text, signals, or other information that may be encoded for proper transmission to and/or from other device (e.g., via TCP/IP, UDP/IP, and/or any serial protocol). The data can be received at various predetermined rates, including every 10-, 20-, or 30-milliseconds. Devices can be configured to send data at the predetermined rates such that all data can be sent to the control devices simultaneously. The data can include various types of information. In one example, the information can include monitoring data for an asset. In one aspect of this example, the monitoring data can be received from a sensor associated with the asset, such as a transformer. The data can be received via multicast or unicast according to certain embodiments herein.

The data sending module 1622 can send output data from a control device, or other device executing the data sending module 1622, to devices. The data sending module 1622 can enable control devices to send output data to a subset of devices and/or only certain devices. For example, one control device can send output data to one subset of devices while another control device can send output data, e.g., the same output data, to another subset of devices. In this way, all of the devices can receive output data, albeit from different control devices in the above example. According to one embodiment, the devices can receive output data only from a particular control device, e.g., the control device to which it has been configured to listen. Additionally, the data sending module 1622 can send output data to other control devices or computing devices. In one embodiment, the data received from the devices can be sent from a control device, e.g., as output data, to such other control devices or computing devices. In one embodiment, output data can be sent via multicast or unicast and can include, but are not limited to, various data, text, signals, or other information that may be encoded for proper transmission.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or operations to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

In some embodiments, a method is provided. The method comprises: receiving, by a computing device processor, a user selection of a power generation plant component in a first navigation menu of a human-machine interface (HMI); based at least in part on the user selection, generating, by the computing device processor, a second navigation menu of the HMI; receiving, by the computing device processor, a subsequent user selection of a subcomponent in the second navigation menu of the HMI, wherein the subcomponent is associated with the power generation plant component; generating, by the computing device processor, a control region for the HMI, the control region operable to manipulate the subcomponent; receiving, by the computing device processor, a user input for the control region; and based at least in part on the user input, facilitating, by the computing device processor, manipulation of one or more operations of the subcomponent.

In some embodiments, the component is operable to be manipulated by a predefined task, and wherein the control region comprises one or more operational interfaces operable to execute the predefined task.

In some embodiments, the second navigation menu comprises a list of subcomponents from which the subcomponent is selected, wherein the list is expandable and collapsible.

In some embodiments, the control region comprises one or more operational interfaces operable to manipulate the subcomponent.

In some embodiments, generating a second navigation menu comprises: generating, by the computing device processor, an overview region that displays one or more parameters associated with the component.

In some embodiments, facilitating manipulation of the one or more operations of the subcomponent comprises at least one of: facilitating starting operation of the subcomponent, facilitating stopping operation of the subcomponent, facilitating adjusting a temperature of the subcomponent, and facilitating adjusting a speed of the subcomponent.

In some embodiments, a system is provided. The system comprises: at least one component of a power generation plant, wherein the at least one component comprises at least one subcomponent; at least one computing device processor configured to perform the operations of: receiving a user selection of a power generation plant component in a first navigation menu of a human-machine interface (HMI); based at least in part on the user selection, generating a second navigation menu of the HMI; receiving a subsequent user selection of a subcomponent in the second navigation menu of the HMI, wherein the subcomponent is associated with the power generation plant component; generating a control region for the HMI, the control region operable to manipulate the subcomponent; receiving a user input for the control region; and based at least in part on the user input, facilitating manipulation of one or more operations of the subcomponent.

In some embodiments, an apparatus is provided. The apparatus comprises: at least one memory; and at least one computing device processor, wherein the processor is configured to perform the operations of: receiving a user selection of a power generation plant component in a first navigation menu of a human-machine interface (HMI); based at least in part on the user selection, generating a second navigation menu of the HMI; receiving a subsequent user selection of a subcomponent in the second navigation menu of the HMI, wherein the subcomponent is associated with the power generation plant component; generating a control region for the HMI, the control region operable to manipulate the subcomponent; receiving a user input for the control region; and based at least in part on the user input, facilitating manipulation of one or more operations of the subcomponent.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosure and also to enable any person skilled in the art to practice certain embodiments of the disclosure, including, but not limited to, making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling power generation plant operations, comprising:

presenting, by a computing device processor, a first navigation menu of a human-machine interface (HMI) for a power plant, the first navigation menu being a home screen interface including, in a same user interface, a display of a plurality of main components of the power plant and a tab navigation menu, the display of the plurality of main components including, for each main component, a selectable listing of each screen interface associated with the respective main component and the tab navigation menu including an indication of each of the plurality of main components, wherein a user selection of an indication of the plurality of main components in the tab navigation directly navigates to a next lower level screen interface for the selected main component;

receiving, by the computing device processor, a user selection of a power generation plant component in the first navigation menu of a human-machine interface (HMI);

based at least in part on the user selection, generating, by the computing device processor, a second navigation menu of the HMI;

receiving, by the computing device processor, a subsequent user selection of a subcomponent of the power generation plant component in the second navigation menu of the HMI;

generating, by the computing device processor, a control region for the HMI, the control region operable to manipulate the subcomponent;

receiving, by the computing device processor, a user input for the control region; and based at least in part on the user input, facilitating, by the computing device processor, manipulation of one or more operations of the subcomponent, wherein facilitating manipulation of the one or more operations of the subcomponent comprise at least one of:

facilitating starting operation of the subcomponent, facilitating stopping operation of the subcomponent, facilitating adjusting a temperature of the subcomponent, and facilitating adjusting a speed of the subcomponent.

2. The method of claim 1, wherein the component is operable to be manipulated by a predefined task, and wherein the control region comprises one or more operational interfaces operable to execute the predefined task.

3. The method of claim 1, wherein the second navigation menu comprises a list of subcomponents from which the subcomponent is selected, wherein the list is expandable and collapsible.

4. The method of claim 1, wherein the control region comprises one or more operational interfaces operable to manipulate the subcomponent.

5. The method of claim 1, wherein generating a second navigation menu comprises:

generating, by the computing device processor, an overview region that displays one or more parameters associated with the component.

6. A system for controlling power generation plant operations, comprising:

a power generation plant, wherein the power generation plant component comprises at least one subcomponent;

at least one computing device processor configured to perform the operations of:

presenting a first navigation menu of a human-machine interface (HMI) for a power plant, the first navigation menu being a home screen interface including, in a same user interface, a display of a plurality of main components of the power plant and a tab navigation menu, the display of the plurality of main components including, for each main component, a selectable listing of each screen interface associated with the respective main component and the tab navigation menu including an indication of each of the plurality of main components, wherein a user selection of an indication of the plurality of main components in the tab navigation directly navigates to a next lower level screen interface for the selected main component;

receiving a user selection of the power generation plant component in a first navigation menu of the HMI;

based at least in part on the user selection, generating a second navigation menu of the HMI;

receiving a subsequent user selection of a subcomponent of the power generation plant component in the second navigation menu of the HMI;

generating a control region for the HMI, the control region operable to manipulate the subcomponent;

receiving a user input for the control region; and based at least in part on the user input, facilitating manipulation of one or more operations of the subcomponent, wherein facilitating manipulation of the one or more operations of the subcomponent comprises at least one of:

facilitating starting operation of the subcomponent, facilitating stopping operation of the subcomponent, facilitating adjusting a temperature of the subcomponent, and facilitating adjusting a speed of the subcomponent.

7. The system of claim 6, wherein the component is operable to be manipulated by a predefined task, and wherein the control region comprises one or more operational interfaces operable to execute the predefined task.

8. The system of claim 6, wherein the second navigation menu comprises a list of subcomponents from which the subcomponent is selected, wherein the list is expandable and collapsible.

9. The system of claim 6, wherein the control region comprises one or more operational interfaces operable to manipulate the subcomponent.

10. The system of claim 6, wherein generating a second navigation menu comprises: generating an overview region that displays one or more parameters associated with the component.

11. An apparatus for controlling power generation plant operations, comprising:

at least one memory; and at least one computing device processor, wherein the processor is configured to perform the operations of:

presenting a first navigation menu of a human-machine interface (HMI) for a power plant, the first navigation menu being a home screen interface including, in a same user interface, a display of a plurality of main components of the power plant and a tab navigation menu, the display of the plurality of main components including, for each main component, a selectable listing of each screen interface associated with the respective main component and the tab navigation menu including an indication of each of the plurality of main components, wherein a user selection of an indication of the plurality of main components in the tab navigation directly navigates to a next lower level screen interface for the selected main component;

receiving a user selection of a power generation plant component in the first navigation menu of the HMI;

based at least in part on the user selection, generating a second navigation menu of the HMI;

receiving a subsequent user selection of a subcomponent of the power generation plant component in the second navigation menu of the HMI;

generating a control region for the HMI, the control region operable to manipulate the subcomponent;

receiving a user input for the control region; and based at least in part on the user input, facilitating manipulation of one or more operations of the subcomponent wherein facilitating manipulation of the one or more operations of the subcomponent comprises at least one of:

facilitating starting operation of the subcomponent, facilitating stopping operation of the subcomponent, facilitating adjusting a temperature of the subcomponent, and facilitating adjusting a speed of the subcomponent.

12. The apparatus of claim 11, wherein the component is operable to be manipulated by a predefined task, and wherein the control region comprises one or more operational interfaces operable to execute the predefined task.

13. The apparatus of claim 11, wherein the second navigation menu comprises a list of subcomponents from which the subcomponent is selected, wherein the list is expandable and collapsible.

14. The apparatus of claim 11, wherein the control region comprises one or more operational interfaces operable to manipulate the subcomponent.

15. The apparatus of claim 11, wherein generating a second navigation menu comprises: generating an overview region that displays one or more parameters associated with the component.

* * * * *